United States Patent
Lidman et al.

(10) Patent No.: US 10,867,344 B1
(45) Date of Patent: Dec. 15, 2020

(54) SYSTEMS AND METHODS FOR COMMODITY EXCHANGES

(71) Applicant: Futures Partners LLC, Falmouth, MA (US)

(72) Inventors: David Lidman, Marstons Mills, MA (US); Jack Newton, Falmouth, MA (US); Donald Maggioli, Quincy, MA (US); Brendon Albrizio, Somerville, MA (US); David Newton, Falmouth, MA (US)

(73) Assignee: Futures Partners LLC, Falmouth, MA (US)

( * ) Notice: Subject to any disclaimer, the term of this patent is extended or adjusted under 35 U.S.C. 154(b) by 0 days.

(21) Appl. No.: 16/724,882

(22) Filed: Dec. 23, 2019

(51) Int. Cl.
*G06Q 30/06* (2012.01)
*G06Q 50/06* (2012.01)
*G06Q 30/02* (2012.01)

(52) U.S. Cl.
CPC ..... *G06Q 30/0637* (2013.01); *G06Q 30/0234* (2013.01); *G06Q 50/06* (2013.01)

(58) Field of Classification Search
CPC ........ G06Q 10/00; G06Q 20/00; G06Q 30/00; G06Q 40/00; G06Q 30/0637; G06Q 30/03254; G06Q 50/06
USPC ...................................................... 705/3–44
See application file for complete search history.

(56) References Cited

U.S. PATENT DOCUMENTS

| | | | | |
|---|---|---|---|---|
| 7,353,192 B1* | 4/2008 | Ellis | ................... | G06Q 20/3829 705/26.5 |
| 7,478,747 B2* | 1/2009 | Call | ....................... | G06Q 10/00 235/375 |
| 8,160,952 B1* | 4/2012 | Fell | ........................ | G06Q 40/00 705/37 |
| 8,438,064 B2* | 5/2013 | Berrio | .................... | G06Q 20/20 705/16 |
| 8,459,562 B1* | 6/2013 | Field | .................... | G06Q 20/357 235/492 |

(Continued)

OTHER PUBLICATIONS

Voinov et al., "Pricing strategies inelastic energy markets: we can use less if we can't extract more?", Front. Earth Sci. 2014, 8(1):3:17 (Year: 2014).*

(Continued)

*Primary Examiner* — Frantzy Poinvil
(74) *Attorney, Agent, or Firm* — Wolf, Greenfield & Sacks, P.C.

(57) ABSTRACT

The present invention relates to systems for completing sales to a consumer with a new card that combines the process of dispensing pre-purchased commodities from a customer account at the point of sale as well as the ability to complete the transaction with a credit and debit function. The present invention includes a distributed system having at least a part for sales of a commodity and at least one a part for dispensing of a commodity. The distributed system includes a communication connection between the parts. A first entity uses the first part of the distributed system to sell commodities to a consumer to be dispensed at a later time. The consumer obtains the commodities in differing amounts from the amounts sold from a second entity. The second entity uses the second part of the distributed system and the communication link between the first and second parts of the distributed system to verify amounts available to be dispensed to the consumer.

30 Claims, 17 Drawing Sheets

(56) References Cited

U.S. PATENT DOCUMENTS

| | | | | |
|---|---|---|---|---|
| 8,622,308 B1* | 1/2014 | Field | .................... | G06Q 20/357 |
| | | | | 235/492 |
| 9,105,020 B2* | 8/2015 | Ronca | ................ | G06Q 20/3278 |
| 2001/0049626 A1* | 12/2001 | Nicholson | .......... | G06Q 30/0222 |
| | | | | 705/14.23 |
| 2013/0124347 A1* | 5/2013 | Hwang | .............. | G06Q 30/0283 |
| | | | | 705/16 |
| 2014/0006151 A1* | 1/2014 | Grigg | .................... | G07F 13/025 |
| | | | | 705/14.53 |
| 2015/0012347 A1* | 1/2015 | Nicholson | .......... | G06Q 30/0236 |
| | | | | 705/14.28 |
| 2015/0106204 A1* | 4/2015 | Pudar | ................. | G06Q 30/0269 |
| | | | | 705/14.58 |
| 2016/0055467 A1* | 2/2016 | Racusin | ............... | G06Q 20/145 |
| | | | | 705/14.1 |
| 2017/0205268 A1* | 7/2017 | Misson | ............... | G01F 23/0007 |

OTHER PUBLICATIONS

"Dephi Automotive PLC Annual Investor Meeting"—Final, Fair Disclosure Wiure; Linthicum, ProQuest Document ID 1316120588, Feb. 26, (Year: 2013).*

* cited by examiner

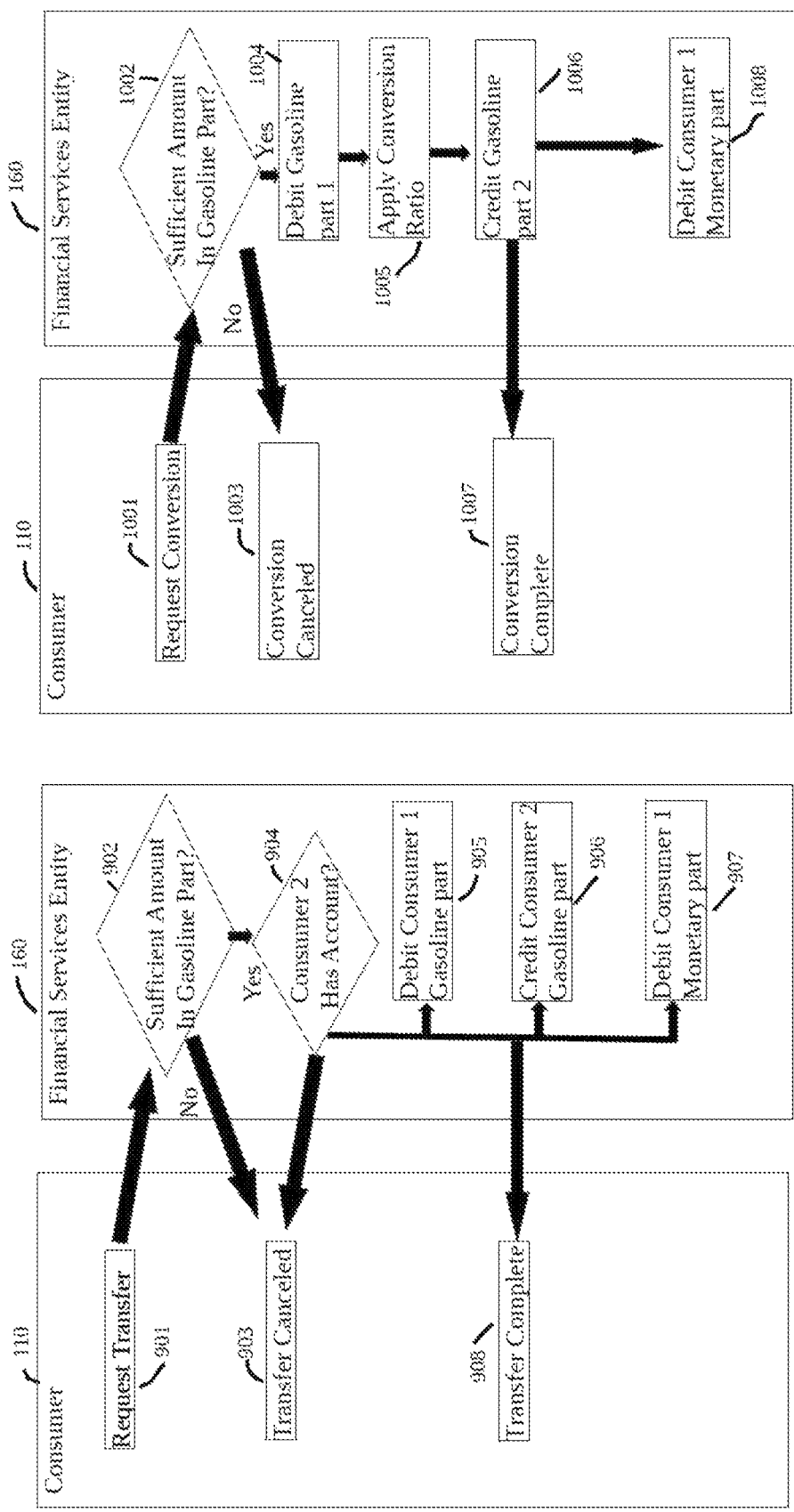

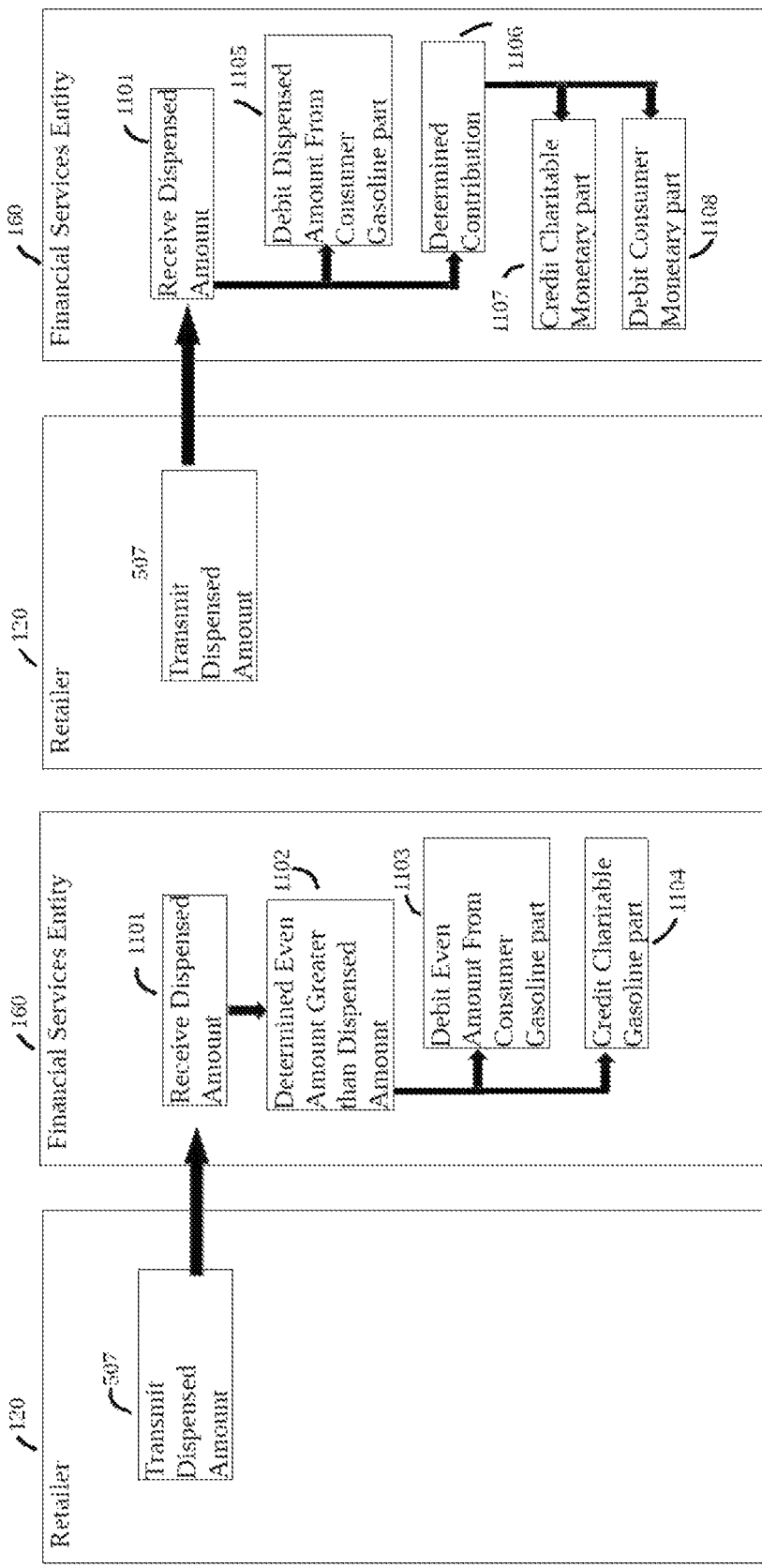

SYSTEMS AND METHODS FOR COMMODITY EXCHANGES

BACKGROUND

A commodity is any article of commerce, such as a product, provided to Consumers. FIG. 1 represents a typical distribution system for commodities to a Consumer. A Consumer 10 visits a retail establishment 20, either in person or online, to purchase various commodities 21. The retail establishment 20 provides the commodity 21 to the Consumer 10 in exchange for payment 12. The retail establishment obtains commodities 31 from a distributor 30 to sell to Consumers. The distributor 30 may obtain the commodities 41 from a wholesaler 40 who obtains the commodities 51 from a manufacturer or producer 50. In each case, the commodities are obtained based upon payment 22, 32, 42. Additionally, the quantity of the commodity decreases at each step from producer 50 to the Consumer 10 and the price increases, with each entity gaining a profit from its transactions.

In order to facilitate the sale of commodities, financial services companies 61, 62, 63, 64 can be involved in any of the transactions in the process. A financial services company provides a payment on behalf of the purchaser. For example, the financial services company 61 provides a payment 14 to the Retailer 20, in lieu of a payment 12 from the Consumer 10. The financial services company 61 obtains payment 13 from the Consumer 10 at a later date with interest, fees or other remuneration for providing the credit. Sometimes, the seller (producer 50, wholesaler 40, distributor 30, or Retailer 20) provides credit for the purchaser without use of an outside financial services company.

The price of many commodities can be extremely volatile over the course of time. Each entity in the sale and distribution process takes steps to minimize its exposure to the volatility. For example, commodities can be purchased and stored when the price is low. However, there are additional costs involved with storage. Sometimes, a purchaser can work the credit terms to get a specified price in connection with a delivery at a specific time in the future.

SUMMARY

The Assignee has appreciated that Consumers 10 often do not have the opportunity to utilize the price control measures employed by other entities in a distribution system. They may not have the capability of storing large amounts of a commodity and their needs for the commodity can be variable, such that they don't know when they will need more or how much. The Assignee has appreciated that Consumers may wish to better control their expenses relating to commodities having volatile prices without the need for storage of the commodity.

Gasoline is an example of a commodity with a very volatile price. Prices change daily at many retail locations based upon sales, demand and costs from the distributor. Demand for gasoline also varies significantly between periods of heavy travel, such as holiday and vacation times, and other times throughout the year. Moreover, prices vary significantly between retail locations which are relatively close to each other. Furthermore, increased prices at the producer 50 are reflected more quickly at the Retailer 20 than price decreases, due to product storage at each entity along the distribution chain.

Many attempts have been made to provide Consumers with the opportunity to purchase gasoline when prices are lower to be delivered in lesser quantities at later times. One example is U.S. Pat. No. 8,065,191 issued to Rodney Senior on Nov. 22, 2011. This patent discloses a computer and Internet based system for purchase and later distribution of gasoline. The patent provides information about how the sale and later distribution is tracked. What the patent does not disclose is how the gasoline is obtained, distributed, and paid for from entities with access to gasoline. It appears that the computerized system might be run by a single entity with one or multiple locations. Such a system is utilized by First Fuel Banks of St. Cloud, Minn. First Fuel Banks has six retail locations in single area. However, such a system cannot be expanded to a more expansive set of retail locations with different ownership, as is common in the gasoline industry. Although stations may sell a specific brand of gasoline and include signage for that brand, the station is independently owned and operated by a franchisee. There is not common ownership or even common pricing structures among stations.

U.S. Pat. No. 8,346,616 issued to Young Hwang on Jan. 1, 2013 discloses a system which can be used across multiple retail locations. In that system, a hedging company "sells" the gasoline to Consumers. However, the hedging company does not actually own nor distribute gasoline. When a Consumer obtains the gasoline from a Retailer, the hedging company pays the Retailer the current retail price at that location. The hedging company makes investments to cover any increased costs from the time of purchase to the time of sale.

Some embodiments of the present invention substantially overcome the deficiencies of the prior art by providing a system and methods for the sale of commodities by suppliers to be dispensed by retailers which receive the commodity from the suppliers. For example, some embodiments include three unique systems, operated within different entities in a distribution and sales system, which function together to provide a complete operation with efficiencies in communications, transmission, data storage and processing times within each of the three unique systems. In some embodiments, the system may allow consumers to purchase a commodity from a supplier in a quantity larger than the need of the consumer at a given time. The consumer is able to obtain the commodity at various times from one or more retailers of the commodity in amounts less than the total purchased from the supplier. The supplier provides the commodity to the retailer for dispensing to the consumer.

According to a first aspect of the invention, a supplier processing system maintains an account on behalf of the consumer relating to amounts of the commodity purchased. The system credits purchased amounts to the account and debits amounts dispensed by a retailer are from the account. According to another aspect of the invention, the supplier processing system maintains an account of amounts of the commodity distributed to the retailer. The supplier processing system credits the retailer's account for amounts dispensed to consumers when debited from the consumer account. Amounts dispensed by the retailer are automatically transmitted from a point of sale system at the retailer to the supplier processing system.

According to another aspect of the invention, the supplier processing system authorizes dispensing of the commodity by the retailer based upon pre-purchased amounts in the consumer account. According to another aspect of the invention, the supplier processing system determines and provides compensation to the retailer when the point of sale system transmits information regarding dispensing the commodity to the consumer. According to another aspect of the invention, the system allows the consumer to purchase both a first commodity and a second commodity from the supplier. The point of sale system at the retailer authorizes and tracks dispensing the first commodity and the second commodity to the consumer. The supplier processing system determines pre-purchased and dispensed amount of both the first commodity and the second commodity. According to another aspect of the invention, supplier processing system operates to allow the consumer to exchange the first commodity for the second commodity in accordance with a conversion ratio. According to other aspects of the invention, the first and second commodities are different types of gasoline.

According to another aspect of the invention, a financial processing system facilitates the purchase of a commodity from a supplier. To facilitate the purchase and dispensing of the commodity, the financial processing system transfers funds to the supplier for the commodity and the commodity is dispensed to the consumer. The financial processing system further communicates with the supplier processing system and point of sale system to track the purchase and dispensing of the commodity and to maintain accounts for such tracking. According to another aspect of the invention, if the consumer does not have sufficient pre-purchased amounts of the commodity, the financial processing system transfers funds on behalf of the consumer to the retailer for any amounts dispensed which exceed an available amount of pre-purchased commodity.

According to another aspect of the invention, a system is provided for the sale and dispensing of commodities. The system includes three entities. A first entity provides funds to the second entity for the purchase of the commodity. The second entity provides the commodity to at least one third entity for dispensing to consumers. The at least one third entity dispenses the commodity to consumers in amounts less than the amount purchased, but totaling the amount purchased. The present invention includes three processing systems, one at each entity, for communicating and processing information to assist in completion of the sales transactions.

BRIEF DESCRIPTION OF THE DRAWINGS

FIG. 9 is flow diagram depicting a representative process for transfer of gasoline by a first Consumer to a second Consumer in accordance with an embodiment of the invention.

FIG. 10 is a flow diagram depicting a representative process for exchanging a first type of gasoline for a second type of gasoline in accordance with an embodiment of the invention.

FIGS. 11A and 11B are flow diagrams depicting representative processes for making charitable contributions in connection with dispensing gasoline in accordance with embodiments of the invention.

DETAILED DESCRIPTION

Some embodiments of the present invention relate to a system for purchase of a quantity of commodities by a Consumer to be dispensed at various times in smaller quantities. For purposes of this description, the commodities to be purchased and dispensed are described as gasoline or groceries. However, embodiments of the present invention are not limited to these commodities, and can be applied to any commodities for which a Supplier provides, directly or indirectly, the commodities to a Retailer for sale to Consumers. As discussed above with respect to the prior art, a typical distribution chain may include a manufacturer or producer 50, a wholesaler, 40 and a distributor 30 who are each involved in providing a commodity to the Retailer 20. Any of these types of entities would be considered a Supplier within the meaning of the present invention. Accordingly, the use of the term Supplier herein may include one or more entities or companies which provides commodities, such as gasoline or groceries, to a Retailer to be sold to a Consumer.

Figure 1:
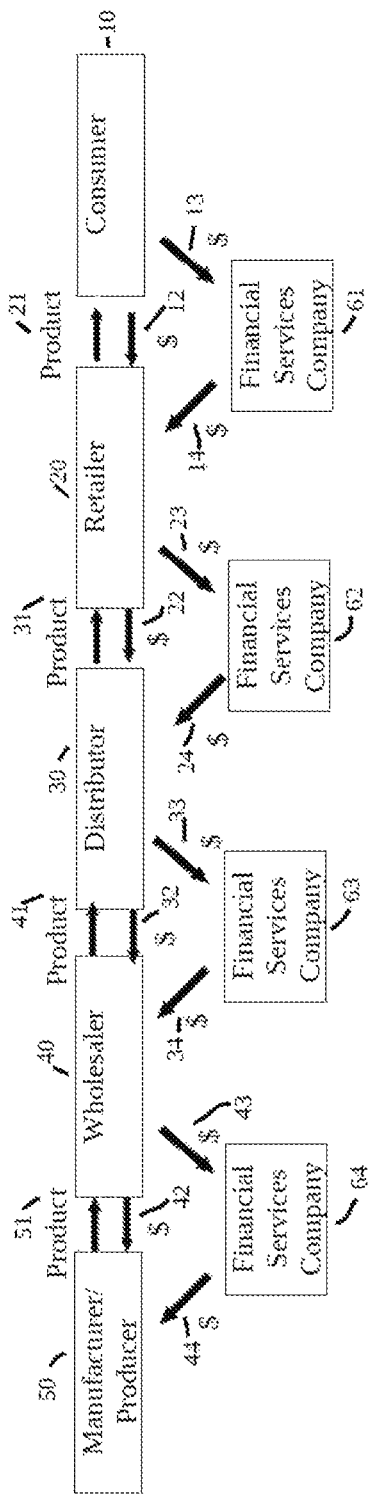
FIG. 1 is a block diagram depicting a typical commodity distribution system of the prior art.
Figure 2:
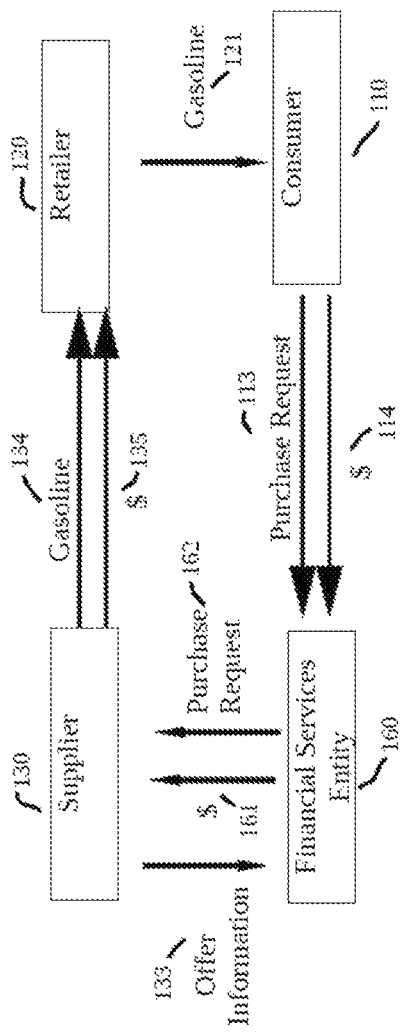
FIG. 2 is a block diagram depicting a representative commodity distribution system according to an embodiment of the present invention.

A system for sale of commodities, such as gasoline or groceries, in accordance with the present invention is illustrated in FIG. 2. In the prior art as illustrated in FIG. 1, a Financial Services Entity 61 can be positioned between the Consumer 10 and the Retailer 20 to facilitate sales to the customer. In accordance with the present invention, a Financial Services Entity 160 is positioned between the customer 110 and a Supplier 130 to facilitate sales by the Supplier 120 to the customer 110. Commodities sold by the Supplier 130 directly to the customer 110 are dispensed by the Retailer 120 at various times on behalf of the Supplier 130.

In accordance with an embodiment of the present invention, as illustrated in FIG. 2, the Consumer 110 purchases 113 gasoline or groceries from the Supplier 130 through the Financial Services Entity 160. In order to purchase gasoline or groceries from the Supplier 130, the Consumer 110 first creates an account with the Financial Services Entity 160. An account is similar to a credit and/or debit account as is known in the financial services industry. The account allows the Financial Services Entity 160 to make monetary payments on behalf of the Consumer 110 in accordance with certain terms and conditions. The Financial Services Entity 160 can be any company which provides financial services to consumers 110. In which case, the Consumer 110 may already have an account with the Financial Services Entity 160 in some form and the account can be altered, modified or added to in order to provide all of the processes of the present invention. The Consumer 110 agrees to prepay or repay 114 the Financial Services Entity 160 for all monetary payments 161 made on behalf of the Consumer 110, along with any interest or fees to be charged in connection the payments. The Supplier 130 provides 133 information to the Financial Services Entity 160 regarding the types of gasoline or groceries, the quantities, and the prices available for purchase by Consumers 110. At the request 113 of the Consumer 110, the Financial Services Entity 160 pays the Supplier 130 for gasoline or groceries of a specified type, amount and price. Although the Financial Services Entity 160 pays for the gasoline groceries, the actual gasoline or groceries is not transferred from the Supplier 130 to the Financial Services Entity 160 nor to the Consumer 110 at the time of purchase. All gasoline or groceries purchased in accordance with the system of the present invention is retained by the Supplier 130 and is dispensed by a Retailer 120 as described further below.

The system of the present invention can aid the Consumer 110 in budgeting and controlling costs. Price volatility can be extremely difficult for consumers. With significant price swings, costs can increase dramatically within a short period of time. Larger purchases of commodities when prices are low can help control such costs. However, the ability to store large quantities of commodities can be extremely difficult. Storage space also increases costs. Furthermore, many commodities, such as produce, cannot be reasonably stored for long periods of time. Many consumers do not have the capability to store large quantities. Therefore, the present invention provides a mechanism for consumers to make purchases in quantities to obtain discounts and take advantage of the timing of lower prices without the problems of storage.

A type of gasoline refers to any gasoline of a different configuration. Types of gasoline may include gasolines with different octane ratings (commonly 85, 87, 89, 90 and 93), different additives (such as cleaners or ethanol), diesel fuel, racing fuel, airplane fuel, etc. A type of gasoline may also include gasoline available in different geographic areas.

Similarly, the system of the present invention can be used for the sale of groceries. With respect to FIG. 2, the only change necessary is to change "gasoline" to "groceries". Instead of types of gasoline, the types of the commodity are different groceries, including brands and sizes. Whereas types of gasoline are generally small in number, groceries include hundreds of SKU. The system of the present invention can be scaled to include the hundreds of SKUs as different types of the commodities.

Figure 17:
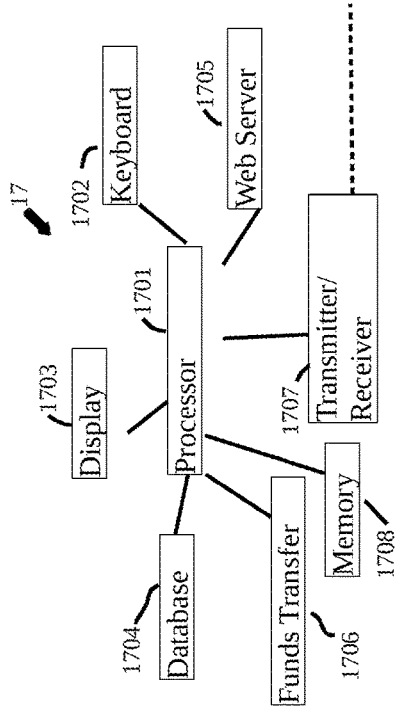
FIG. 17 is a block diagram depicting a representative system which can be utilized by a financial services entity in accordance with an embodiment of the invention.
Figure 16:
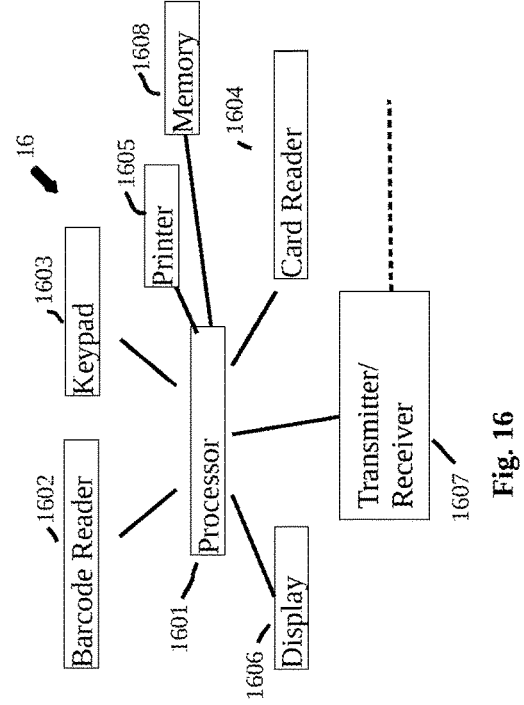
FIG. 16 is a block diagram depicting a representative point of sale system which can be utilized by a retailer in accordance with an embodiment of the invention.
Figure 18:
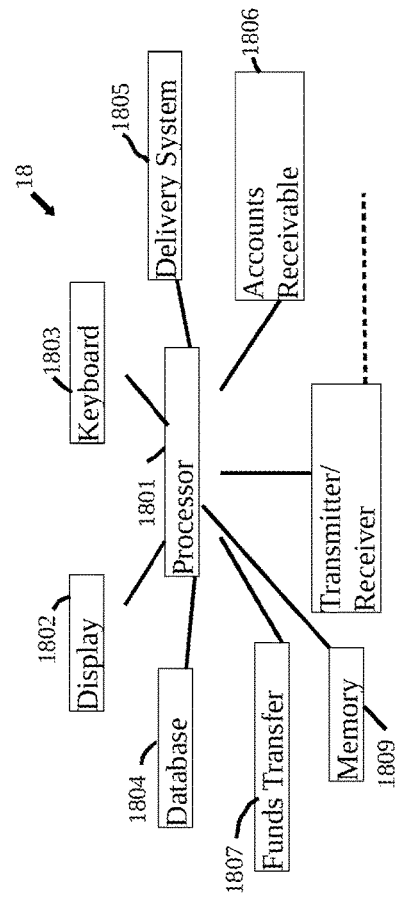
FIG. 18 is a block diagram depicting a representative system which can be utilized by a supplier in accordance with an embodiment of the invention.

FIGS. 16-18 illustrate an embodiment of the systems utilized at the retailer 120, financial services entity 160, and supplier 130 to create a complete sales system according to the present invention. It is known to utilize specialized computerized system for sales of commodities. However, the specific systems utilized in the present invention are not known including communications between the systems represented in FIGS. 16-18.

FIG. 16 represents a point of sale system 16 which can be utilized at a retailer 120. A point of sale system 16 is used to collate prices and quantities of commodities and to verify collection of payments to complete purchases. Examples of point of sale systems include checkout lanes for groceries or automated gasoline pumps for gasoline. A point of sale system 16 may be contained in a single device, such as a computerized cash register, but more typically would include several different connected devices. As illustrated in FIG. 16, the point of sale system 16 includes a programmed processor 1601 for performing various steps of the present invention and for operating the various connected devices. Although a single processor 1601 is illustrated, the present invention may include multiple connected processors which perform different functions in operating devices and communicating information between the processors. Connected to the processor 1601 are various devices for performing various functions in connection with the sale of commodities. A barcode reader 1602 can read barcodes on commodity packaging in order to input and collect information about the commodities being purchased. The barcode reader 1602 can also read a barcode on a card or displayed on a smartphone to identify a Consumer 110. A keypad 1603 is used to input information about the commodities and/or Consumer 110. For example, the keypad 1603 can be used to input SKUs for the commodities being purchased. The keypad 1603 may also be used to input an account number to identify the Consumer 110 and for the Consumer 110 to input a PIN, password, or code as additional security during identification of the Consumer 110. A card reader 1604 is used to read a magnetic strip or chip on a card to obtain information identifying the Consumer 110. A printer 1605 can output a receipt for the purchase of the commodities. A display 1606 can be used to communicate information to the Consumer 110. A transmitter/receiver 1607 connects the point of sale system 16 to other systems utilized in the present invention. The transmitter/receiver 1607 may be directly connected to the other systems of the present invention, may be connected over a telephone line with a telephone dialer, or may be connected over the Internet with a wired or wireless connection to an Internet access point. The transmitter/receiver 1607 includes appropriate security protocols for authenticating transmissions to the financial processing system 17 (illustrated in FIG. 17) and/or the supplier processing system 18 (illustrated in FIG. 18). A memory 1608 provides storage for the processor in performing the steps in operation of the point of sale system 16. Programming instructions providing the steps for operation of the point of sale system 16 are also stored the memory 1608.

FIG. 17 illustrates a financial processing system 17 according to an embodiment of the present invention which can be utilized by a financial services entity 160 to interact with the other entities according to the present invention. As with the point of sale system 16, the financial processing system 17 may be incorporated into a single device, but preferably includes several connected devices. The financial processing system 17 includes a processor 1701 to control the system and to carry out the functions for operation of the system of the present invention. The processor 1701 is connected to a keyboard 1702 and display 1703 for control by an operator. A database 1704 includes information about accounts (discussed below) and is accessed to verify and update amounts in various accounts as required in performing the functions of the invention. A web server 1705 provides a connection to the Internet so that the Consumer 110 to access their account information and to make purchases of commodities through the system of the present invention. A funds transfer system 1706 operates to transfer monetary funds to the Supplier 130 and/or Retailer 120 as discussed herein. As with the point of sale system 16, the financial processing system 17 includes a transmitter/receiver 1707 to communicate with the other systems of the present invention. The transmitter/receiver 1707 would operate in a similar manner to the transmitter/receiver 1607 of the point of sale system 16. A memory 1708 provides storage for the processor in performing the steps in operation of the financial processing system 17. Programming instructions providing the steps for operation of the financial processing system 17 are also stored the memory 1708.

FIG. 18 illustrates a supplier processing system 18 according to an embodiment of the present invention. As with the other systems of the present invention, the supplier processing system 18 can be contained in a single device or, preferably, includes several connected devices. The supplier processing system 18 includes a processor 1801, display 1802 and keyboard 1803. A database 1804 includes account information relating to the financial services entity accounts and the retailer accounts as discussed below. A delivery system 1805 operates to deliver commodities to Retailers 120. The quantities, timing and costs associated with delivery of commodities are controlled by the supplier processing system 18 through the delivery system 1805. An accounts receivable system 1806 is used to charge Retailers 120 for the costs of commodities delivered with appropriate discounts and deductions in accordance with the present invention. A funds transfer system 1807 is used to receive monetary funds from the financial services entity 160 and to transfer monetary funds, as necessary, to the Retailer 120 as discussed below regarding payments of monetary funds. As with the other systems of the present invention, the supplier processing system 18 includes a transmitter/receiver 1808. The transmitter/receiver 1808 operates in a manner similar to the other transmitter/receivers (1607, 1707) to transmit and receive the information between the various entities in carrying out the present invention. A memory 1809 provides storage for the processor in performing the steps in operation of the supplier processing system 18. Programming instructions providing the steps for operation of the supplier processing system 18 are also stored the memory 1809.

It should be appreciated that instructions for performing point of sale, financial processing, supplier processing, and/or other functions need not be stored on separate memories 1608, 1708 and 1809. These and other instructions may be stored on any suitable number of physical memories and/or other computer-readable storage media. Further, it should be appreciated that the characterization of components 1608, 1708 and 1809 as "memories" does not connote that these components support only read-only access to data stored thereon. Any or all of memories 1608, 1708 and 1809 may support volatile (e.g., random access memory) storage, non-volatile storage (e.g., read-only memory), or a combination thereof.

Figure 3:
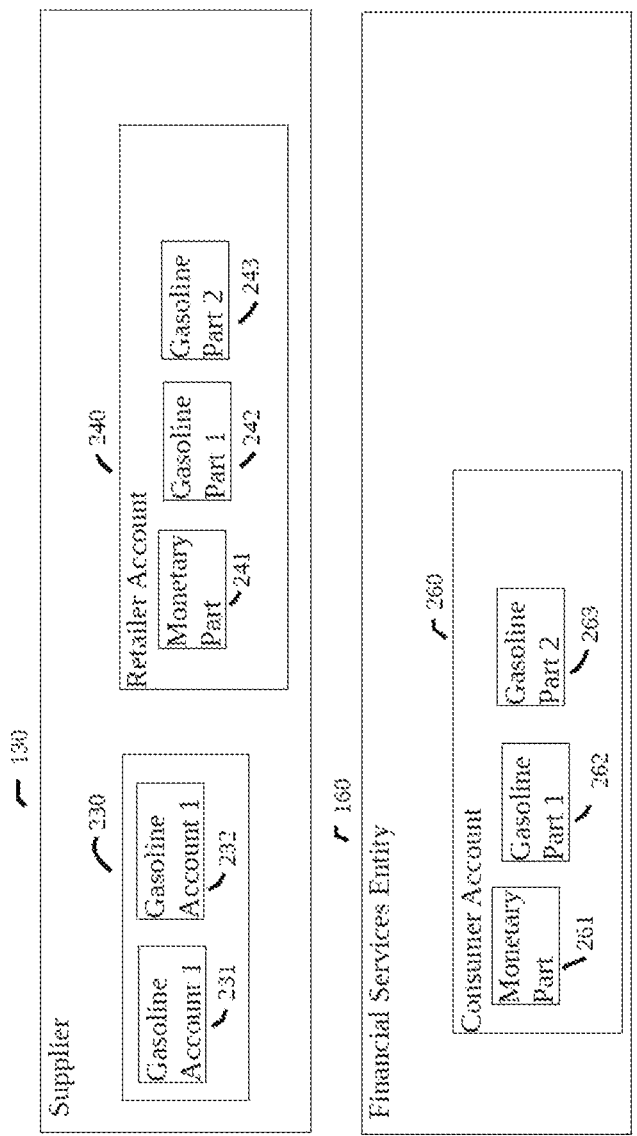
FIG. 3 is a block diagram depicting a representative financial services account system for commodity distribution in accordance with an embodiment of the invention.

Representative accounts utilized in an embodiment of the present invention are illustrated in FIG. 3. Accounts are used by the Financial Services Entity 160 and the Supplier 130 to track the purchase, sale, and dispensing of gasoline (or groceries or other commodities) between them and with the Consumer 110. The accounts are maintained in the databases 1704, 1804 of the financial processing system 17 and the supplier processing system 18, respectively. There is a Supplier account 230 maintained by the Supplier 130 relating to gasoline paid for by the Financial Services Entity 160. The Financial Services Entity 160 maintains a Consumer account 260 for each Consumer 110 who participates in the system of the present invention.

The Supplier account includes one or more gasoline accounts 231, 232. There is a gasoline account 231, 232 for each type of gasoline offered for sale by the Supplier. The gasoline accounts 231, 232 represent the amount of gasoline, typically in gallons, of each type which has been paid for by the Financial Services Entity 160. For groceries or other commodities, an account 231, 232 would exist for each type of commodity, generally referenced by SKU numbers.

The Financial Services Entity 160 makes a payment, between the funds transfer systems 1706, 1807, to the Supplier 130 for a specific type and amount of gasoline on behalf of a Consumers 110. Information regarding the type and quantity of gasoline (or other commodity) is sent from transmitter 1707 to transmitter/receiver 1808. Upon receiving payment and transferred information, the gasoline account 231, 232 for the type of gasoline is credited with the amount of gasoline corresponding to payment amount. When gasoline is dispensed utilizing the system of the present invention, as discussed below, the gasoline account 231, 232 for the type of gasoline is reduced by the amount of gasoline dispensed. Thus, the account 230 represents the amount of gasoline of each type which has been purchased by the Financial Services Entity 160 on behalf of Consumers but not yet dispensed.

The Supplier 130 also maintains a Retailer account 240 for each Retailer 120 to whom it supplies gasoline. As is known in the gasoline industry, the Retailer account 240 has a monetary part 241 which is used by the Supplier to track money paid by and/or owed by the Retailer for gasoline obtained by the Retailer 120 from the Supplier 130. Typically, the Retailer 120 purchases gasoline from the Supplier 130 and the Supplier 130 delivers the gasoline to the tanks of the Retailer 120. The amount of gasoline delivered by the Supplier 130 may depend upon the amount purchased by the Retailer 120 or by the space available in the tanks at the time of delivery. The purchase price of the gasoline to the Retailer 120 may depend upon the prevailing rates being charged by the Supplier 130 and any contractual agreements between the Retailer 110 and the Supplier 130 for surcharges or discounts. Depending upon the arrangements between the Supplier 130 and the Retailer 120, the delivered gasoline are deducted. Often, the Supplier 130 provides credit to the Retailer 120 for gasoline delivered which must be paid within set times. In this case, the cost of the gasoline is debited from the monetary part 241 of the Retailer account 240, and the account is typically negative representing amounts owed by the Retailer 120. Amounts owed by the Retailer 120 are periodically processed by the accounts receivable system 1806 of the supplier processing system 18 to generate charges to the Retailer 120.

In accordance with an embodiment of the present invention, the Retailer account 240 may also include one or more gasoline parts 242, 243. Gasoline accounts represent gasoline dispensed by the Retailer 120 to the Consumer 110 in the system of the present invention. Each gasoline part 242, 243 represents a specified type of gasoline. For other commodities, the Retailer account 240 would have parts 242, 243 corresponding to each type of commodity, typically associated with SKUs.

As noted previously, other entities may be in the distribution chain between the Supplier 160 and the Retailer 120. In such a case, each entity would have appropriate accounts corresponding to the Retailer account 240 shown in FIG. 3. Gasoline parts and monetary parts would be debited and credited up and down the distribution chain in accordance with each payment or transfer of gasoline. For simplicity, the present invention is illustrated with a Supplier 160 providing gasoline directly to a Retailer 120. However, the present invention could be implemented by those of skill in the art with other entities in the distribution chain without departing from the spirit of the invention.

A Consumer account 260 also has several parts. The Consumer account 260 includes a monetary part 261 to track monies paid by and on behalf of Consumers. This part is similar to accounts known in the financial services industry. When the Financial Services Entity 160 makes a payment on behalf of a Consumer 110, the amount of the payment is debited from the monetary part 261 of the Consumer account 260. When the Consumer 110 makes a payment 113 (in FIG. 2), the amount of the payment is credited to the monetary part 261 of the Consumer account 260. Any applicable interest or fees are also debited from the monetary part 261 of the Consumer account 260 at appropriate times. Thus, at all times, the monetary part 261 of the Consumer account 260 represent the amount of money owed by the Consumer 110 to the Financial Services Entity 160. In accordance with contractual relations between the Consumer 110 and the Financial Services Entity 160, the Financial Services Entity 160 may require payments 113 of specified amounts from the Consumer and/or refuse to pay the Supplier for additional gasoline based upon the value in the monetary part 261 of the Consumer account 260.

The Consumer account 260 also includes one or more gasoline parts 262, 263 representing quantities of different types of gasoline. The gasoline parts 262, 263 for a Consumer are credited with the amount of gasoline of a specified type paid for by the Financial Services Entity 160 on behalf of that Consumer 110. The gasoline parts 262, 263 are debited when gasoline of a specified type is dispensed to that Consumer 110.

FIGS. 4-15 are flow charts representing payments made, account credits and debits, and gasoline dispensed in accordance with an embodiment of the present invention and several variations of that embodiment. The flow charts in FIGS. 4-15 represent the transfer of information and/or funds between and among the Consumer 110, Retailer 120, Supplier 130 and Financial Services Entity 160. For information being transferred, the information would be transmitted and received by the corresponding transmitter/receiver 1607, 1707, 1808 of the point of sale system 16, financial processing system 17, and supplier processing system 18, respectively. The transfer of information can be done in any known manner for transmitting and receiving electronic information. The processed for transferring and processing information in each system will not be further discussed in connection with FIGS. 4-15. Those of skill in the art would be able to implement the enumerated actions through use of the systems discussed above with respect to FIGS. 16-18.

Figure 4:
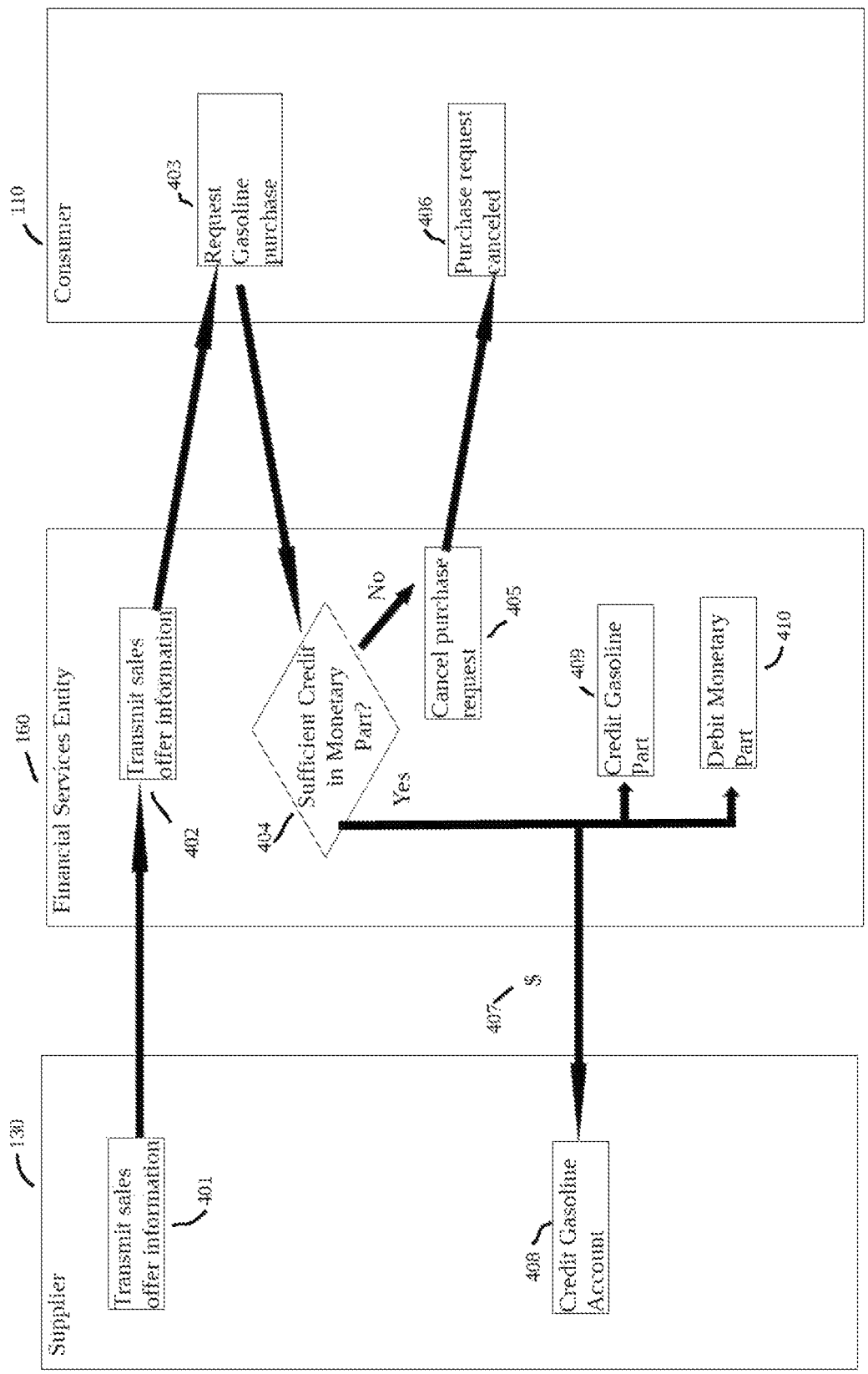
FIG. 4 is a flow diagram depicting a representative process for purchase of gasoline from a Supplier by a Consumer in accordance with an embodiment of the invention.

FIG. 4 is a flow diagram representing purchase of gasoline from the Supplier 160 and crediting of appropriate accounts 240, 260 upon such purchase. FIG. 4 represents three entities involved in the process of purchasing gasoline, the Consumer 110, the Financial Services Entity 160 and the Supplier 130. The process illustrated herein presumes that the Consumer has already opened an account with the Financial Services Entity 160 with defined credit limits and payment terms. At step 401, the Supplier 130 provides sales offer information to the Financial Services Entity 160. Sales offer information may include types of gasoline with corresponding amounts available for purchase and prices. At step 402, the Financial Services Entity 160 provides the sale offer information to the Consumer 110. Preferably, the information is provided by means of a web site or computer application, such as via one or more mobile applications. The web server 1705 of the financial processing system 17 includes the sales offer information which can be accessed by the Consumer 110. The Consumer 110 connects to the web server 1705 from a computer, smartphone or other Internet access device. The Consumer would sign into the website or computer application to obtain the sales offer information and to select and make purchases. At step 403, the Consumer 110 uses the website or computer application to request a purchase of gasoline in accordance with the terms of the sales offer information. The purchase request would include the type of gasoline and the amount to be purchased. The purchase request is sent to the Financial Services Entity 160. At step 404, the Financial Services Entity 160 verifies that the Consumer 110 has sufficient credit and/or funds in the monetary part 261 (FIG. 3) of the Consumer account 260 (FIG. 3) to complete the purchase. If there are insufficient funds, the Financial Services Entity 160 cancels the purchase (step 405) and informs the Consumer, through the website or computer application, that the purchase has been canceled (step 406). If there are sufficient credit or funds in the monetary part of the Financial Services Entity 160 debits funds for the total cost of the gasoline from the monetary part 261 (FIG. 3) of the Consumer account 260 (FIG. 3) (step 410) and credits the amount of gasoline to one of the gasoline parts 262, 263 (FIG. 3) of the Consumer account 260 (FIG. 3) for the type of gasoline purchased (step 409). The financial services company 160 transfers funds to the Supplier 130 for the amount of the purchase (step 407) and provides information regarding the type of gasoline and amount purchased. The Supplier receives the funds and credits one of the gasoline accounts 231, 232 for the amount of gasoline purchased (step 408) for the type of gasoline purchased.

For groceries (or other commodities), the processes of FIG. 4 would not change substantially. Sales offer information is provided to the Financial Services Entity 160. The sales offer information would include the groceries available for purchase, the quantities and the prices. The sales offer information may have different prices for different quantities of groceries or may include various discounts based upon total amounts of groceries purchased. Upon purchase by the Consumer 110, the appropriate grocery parts of the accounts are updated in a manner similar to gasoline accounts. Payment is made in the same manner.

Figure 5A:
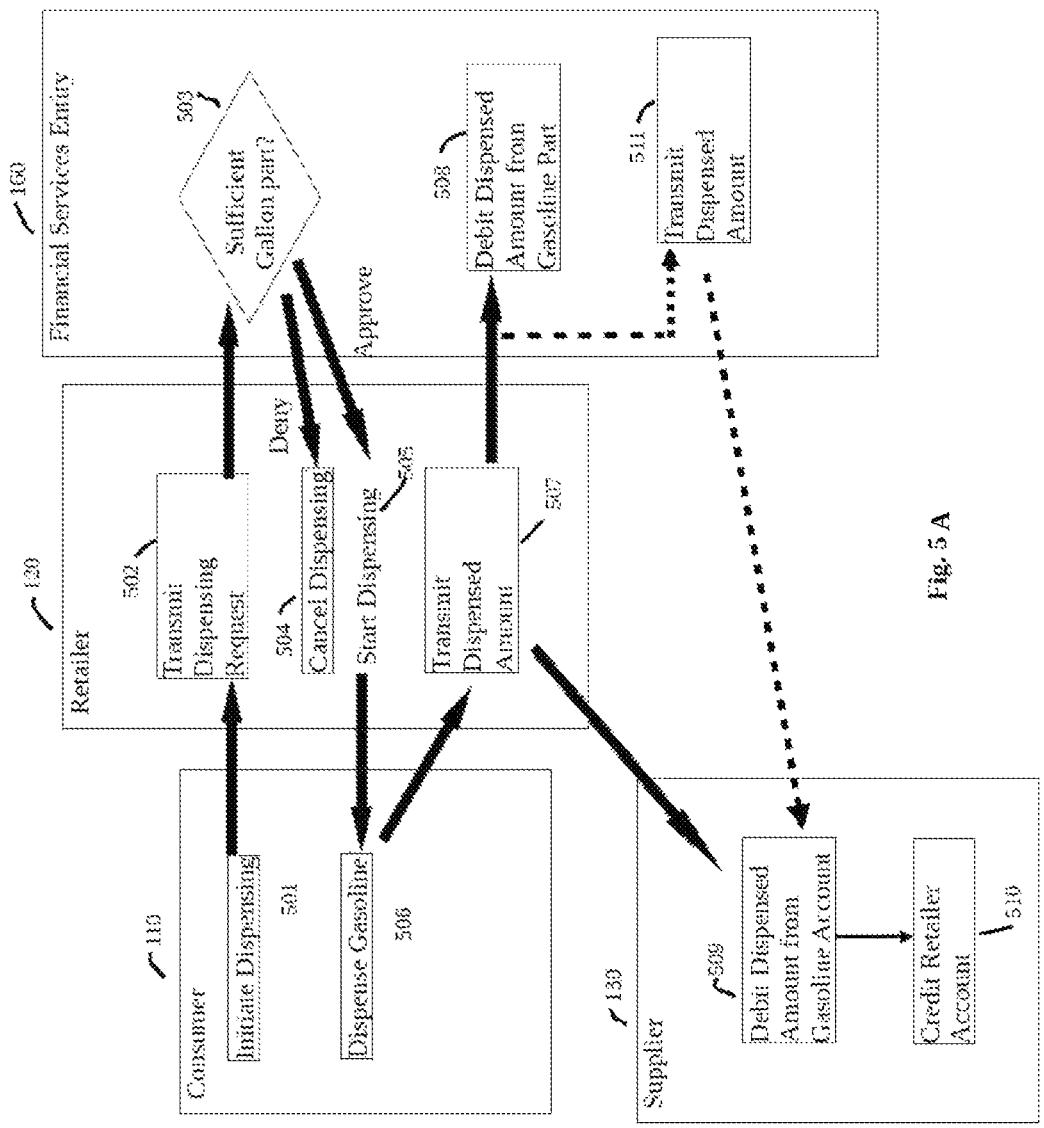
FIG. 5A is a flow diagram depicting a representative process for dispensing of gasoline to a Consumer in accordance with an embodiment of the invention.

FIG. 5A is a flow diagram representing dispensing of gasoline from a Retailer 120 and debiting of appropriate accounts. At step 501, the Consumer 110 starts the process for dispensing of gasoline through input of information regarding the Consumer account 260 (FIG. 3) with the Financial Services Entity 160. This step may be accomplished through use of a card at the gasoline pump of the Retailer 120. Alternatively, it can be commenced by entry of information by a clerk at the Retailer 120. The Consumer 110 also selects the type of gasoline. The Retailer 120 sends the information (step 502) about the Consumer 110, and the type of gasoline selected, through the interconnected computers to the Financial Services Entity 160. The Financial Services Entity 160 verifies that the Consumer 110 has a balance in the Gasoline part 262, 263 of the Consumer Account 260 for the type of gasoline selected (step 503) and transfers an approval to the Retailer 120 (step 503). Preferably, the approval includes the number of gallons of gasoline of the type selected available in a Gasoline part 262, 263 of the Consumer Account 260. Upon receipt of the approval, the Retailer 120 allows the selected type of gasoline to be dispensed from the pump (step 505). If the Consumer 110 does not have sufficient gasoline in the Gasoline part 262, 263 of the Consumer Account 260, the Financial Services Entity denies dispensing of gasoline and the Retailer 120 terminates dispensing (step 504). This is similar to a credit card being declined when attempting to purchase gas under the prior art.

When approved, the Consumer 110 dispenses gasoline from the pump (step 506). After the gasoline is dispensed, the Retailer 120 transfers the amount of gasoline dispensed to both the Supplier 130 and the Financial Services Entity 160 (step 507). Upon receipt of the amount of gasoline dispensed, the Supplier 130 debits the gasoline account of the financial services company (step 509) and credits the Retailer account (step 510). The processes for crediting the Retailer account are discussed below with respect to FIGS. 8A and 8B. The Financial Services Entity 160 debits the Gasoline part 262, 263 of the Consumer Account 260 (step 611) for the type of gasoline dispensed.

An alternative embodiment of the invention is also illustrated in FIG. 5A. In this embodiment, the Retailer does not transmit the amount of gasoline dispensed to the Supplier 130. Instead, upon receipt of the amount of gasoline dispensed from the Retailer 120, the Financial Services Entity 160 transmits that information to the Supplier 130 (step 511). The Supplier 130 takes the same steps described above to debit the Gasoline Account 231, 232 (step 509) and credit the Retailer Account 240 (step 510) in response to the information from the Financial Services Entity 160 as it would if it had received the information from Retailer 120.

Figure 5B:
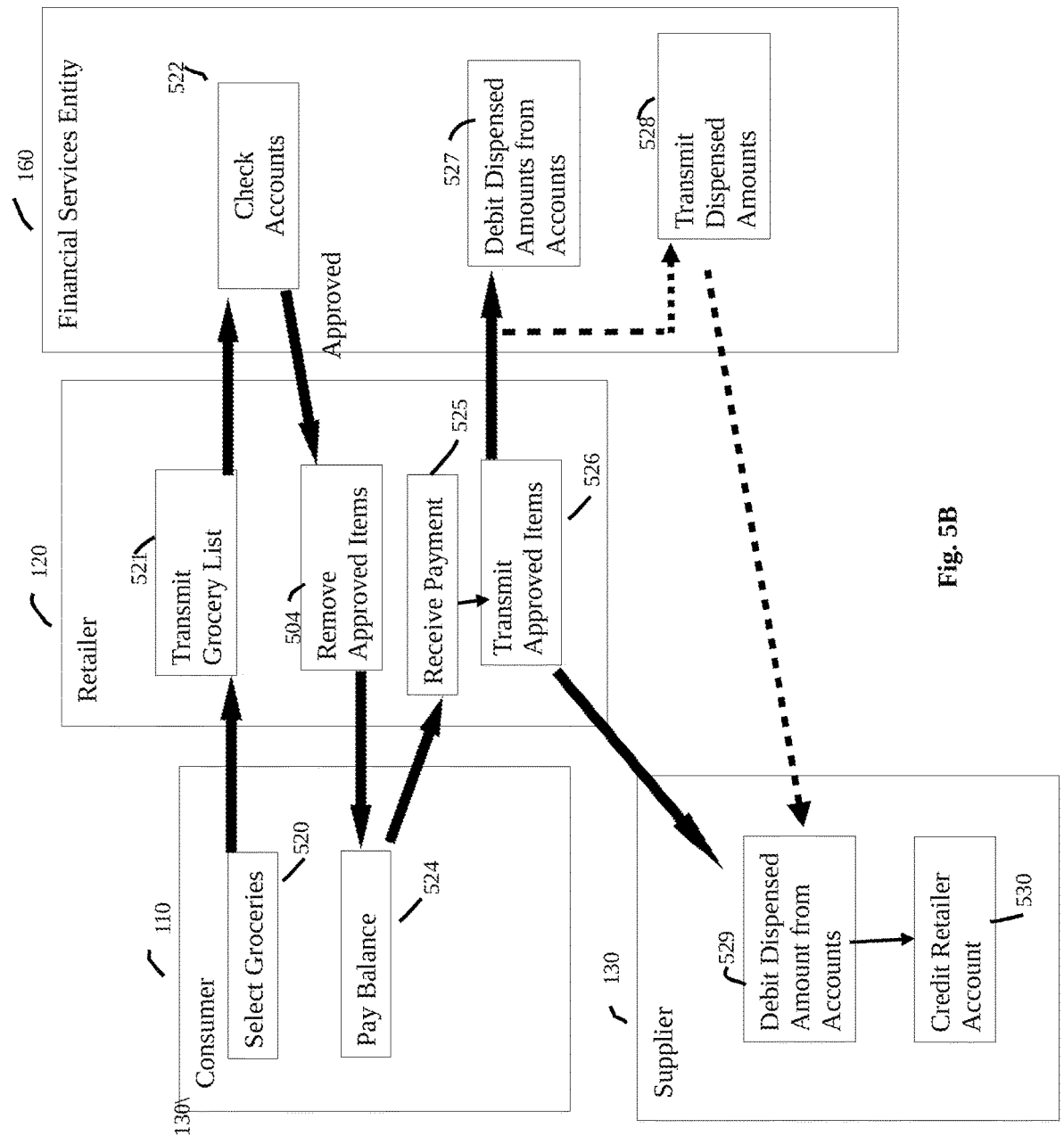
FIG. 5B is a flow diagram depicting a representative process for dispensing groceries to a Consumer in accordance with an embodiment of the invention.

FIG. 5B illustrates an embodiment of the present invention in connection with the sale of groceries or similar commodities. With gasoline, the Consumer 110 dispenses a single type of gasoline as a single purchase. For groceries, the Consumer 110 would have many different types of groceries in a single purchase. For each of the groceries, the accounts would need to be checked to determine if that specific grocery item had sufficient quantity available in the consumer accounts. Therefore, the process is slightly changed, as illustrated in FIG. 5B to change the approval processes. At step 520, the Consumer 110 selects the desired groceries and enters them into the point of sale system 16 at the Retailer. The Consumer 110 can enter the groceries in known manners using the barcode reader 1602 and/or keypad 1603. The Consumer 110 would also enter account information using the keypad 1603 or card reader 1604.

After all of the groceries have been entered, the Retailer 120 transmits the entire grocery list to the Financial Services Entity 160 at step 521. At step 521, the Financial Services Entity 160 checks the Consumer accounts to determine quantities of each grocery item available in those accounts. The Financial Services Entity 160 transmits to the Retailer an approved list of groceries and quantities for which the Consumer 110 has sufficient amounts in the accounts. At step 523, the Retailer 120 removes the cost for all approved grocery items. The Consumer 110 would then pay any remaining balance at step 524. There would be a remaining balance if the Consumer 110 was purchasing more of an item than was available in their account for that item or if an item was not part of the sales offer information from the Supplier 130. The Consumer 110 would pay the balance in the ordinary manner with cash, credit, or debit at the Retailer 120. The Consumer 110 could use the monetary part of the consumer account with the Financial Services Entity 160 to make the payment in which case, the Financial Services Entity 160 would function like any other credit or debit card company. After the Retailer 120 receives payment at step 252, the Consumer 110 is able to leave with the groceries. At step 526, the Retailer 120 transmits the approved items dispensed to the Consumer 110 to both the Supplier 130 and Financial Services Entity 160. As with the embodiment illustrated in FIG. 5A, the Financial Services Entity debits the dispensed amounts from the consumer accounts at step 527. The Supplier 130 debits the dispensed amounts from the Financial Services Entity accounts at step 529 and credits the Retailer accounts at step 530. Alternatively, the Financial Services Entity 160 can transmit the dispensed amounts to the Supplier 130 at step 528.

In the embodiments of the invention illustrated in FIGS. 5A and 5B, the Retailer 120 communicates with the Financial Services Entity 160 to obtain approval to dispense gasoline or groceries. In another embodiment, illustrated in FIGS. 6A and 6B, the Retailer 120 communicates only with the Supplier 130. In this embodiment, as illustrated in FIG. 6A, the Retailer performs the same steps, as in the prior embodiment, of transmitting a request to dispense gasoline (step 502), canceling the dispensing of gasoline (step 504), allowing dispensing of gasoline (step 505) and transmitting the amount of gasoline dispensed (step 507), which are designated with the same reference numbers as in FIG. 5. However, the communications go to the Supplier 130 instead of the Financial Services Entity 160. Upon receipt of a request to dispense gasoline, the Suppler 130 forwards the request to the Financial Services Entity 160. As in the prior embodiment, the Financial Services Entity 160 determines if the Consumer 110 has sufficient gasoline in the Gasoline part 262, 263 of the Consumer Account 260. The approval (or denial) is transmitted to the Supplier 130, which forwards the approval (or denial) to the Retailer 120 (steps 604, 605). After the gasoline is dispensed, the Retailer transmits the amount dispensed only the Supplier 130. As in the previous embodiment, the Supplier 130 debits the dispensed amount from one of the Gasoline Accounts 231, 232 and credits the Retailer Account 240 (steps 609, 610). The Supplier 130 also transmits the amount of gasoline dispensed to the Financial Services Entity 160. The Financial Services Entity 160 debits the amount of gasoline dispensed from one of the Gasoline parts 262, 263 of the Consumer Account 260.

Figure 6:
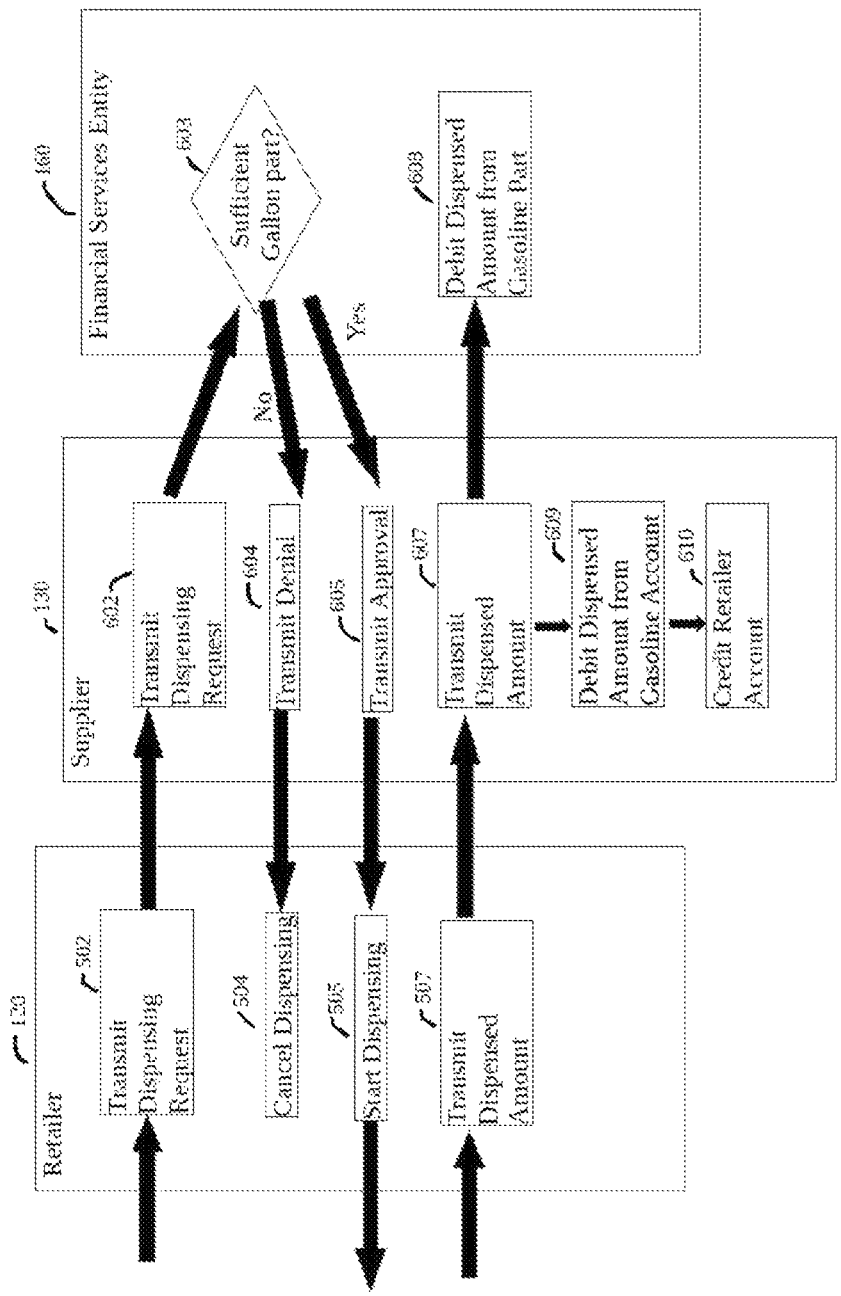
FIG. 6A is a flow diagram depicting an alternative to a part of the process depicted in FIG. 5A, in accordance with an embodiment of the invention.
FIG. 6B is a flow diagram depicting an alternative to a part of the process depicted in FIG. 5B, in accordance with an embodiment of the invention.
Figure 6B:
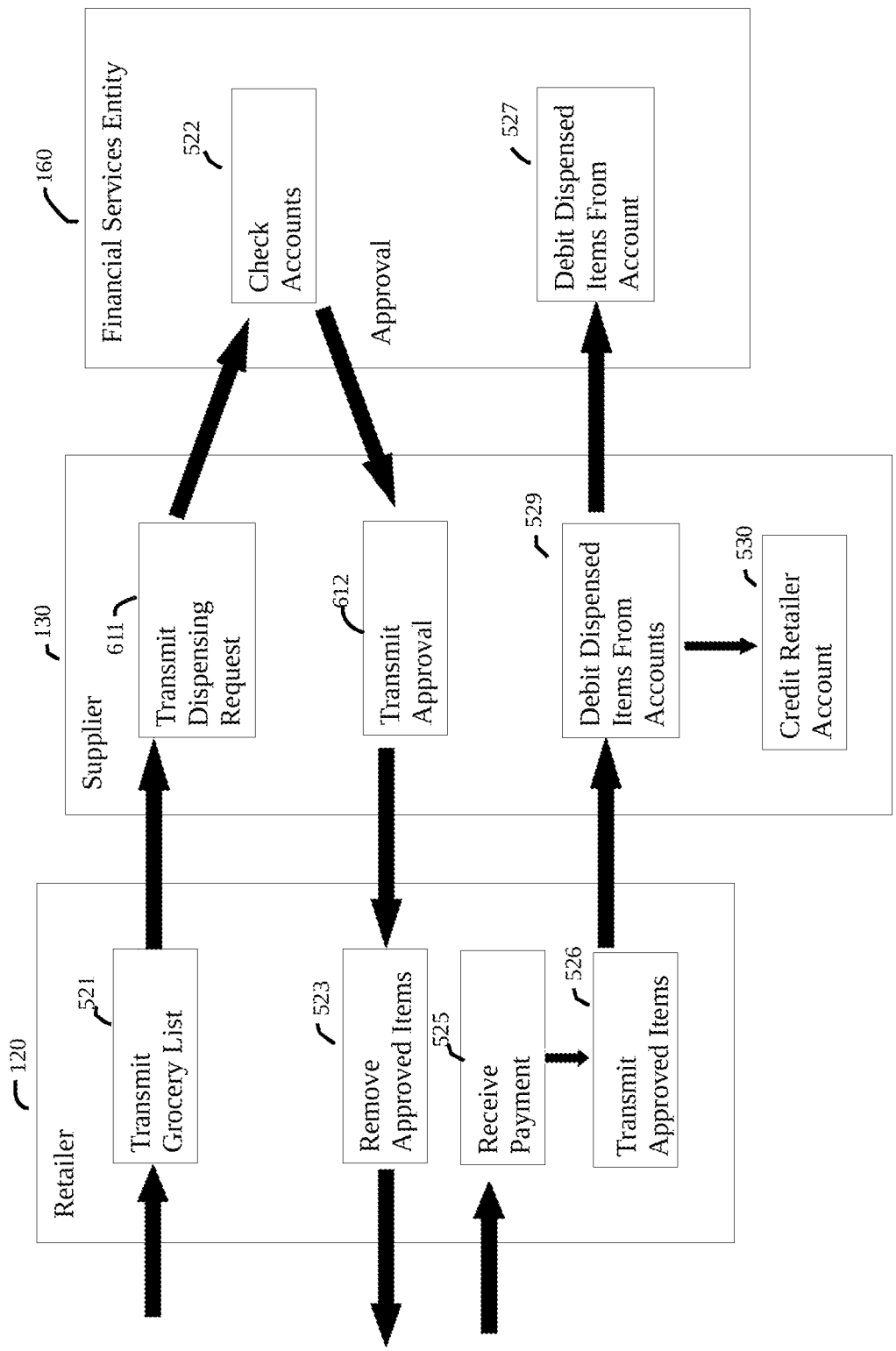

Similarly, in this embodiment with respect to the sale of groceries, as illustrated in FIG. 6B, the Retailer 120 performs the same steps as illustrated in FIG. 6A. At step 521, the grocery list is transmitted. However, in this embodiment, the grocery list is transmitted to the Supplier 130, not the Financial Services Entity 160. The Supplier 120 retransmits the grocery list to the Financial Services Entity 160 at step 611. As in the embodiment of FIG. 6A, at step 522, the Financial Services Entity 160 checks the groceries accounts to determine the quantities available in the Consumer accounts for each grocery item. An approval for groceries, including the amounts approved, is transmitted to the Supplier 130. The Supplier 130 transmits the approval to the Retailer at step 602. The Retailer removes all charges for the approved items from the total at step 523, and the Consumer 110 pays any remaining balance due for groceries. After receiving payment, at step 525, the Retailer 120 transmits the approved and purchased items back to the Supplier 130. The Supplier 130 debits the dispensed items from the grocery accounts at step 529 and credits the Retailer account for those dispensed items at step 530. The Supplier 120 also transmits the dispensed items to the Financial Services Entity 160 which debits the dispensed items from the Consumer account at step 527.

Figure 7:
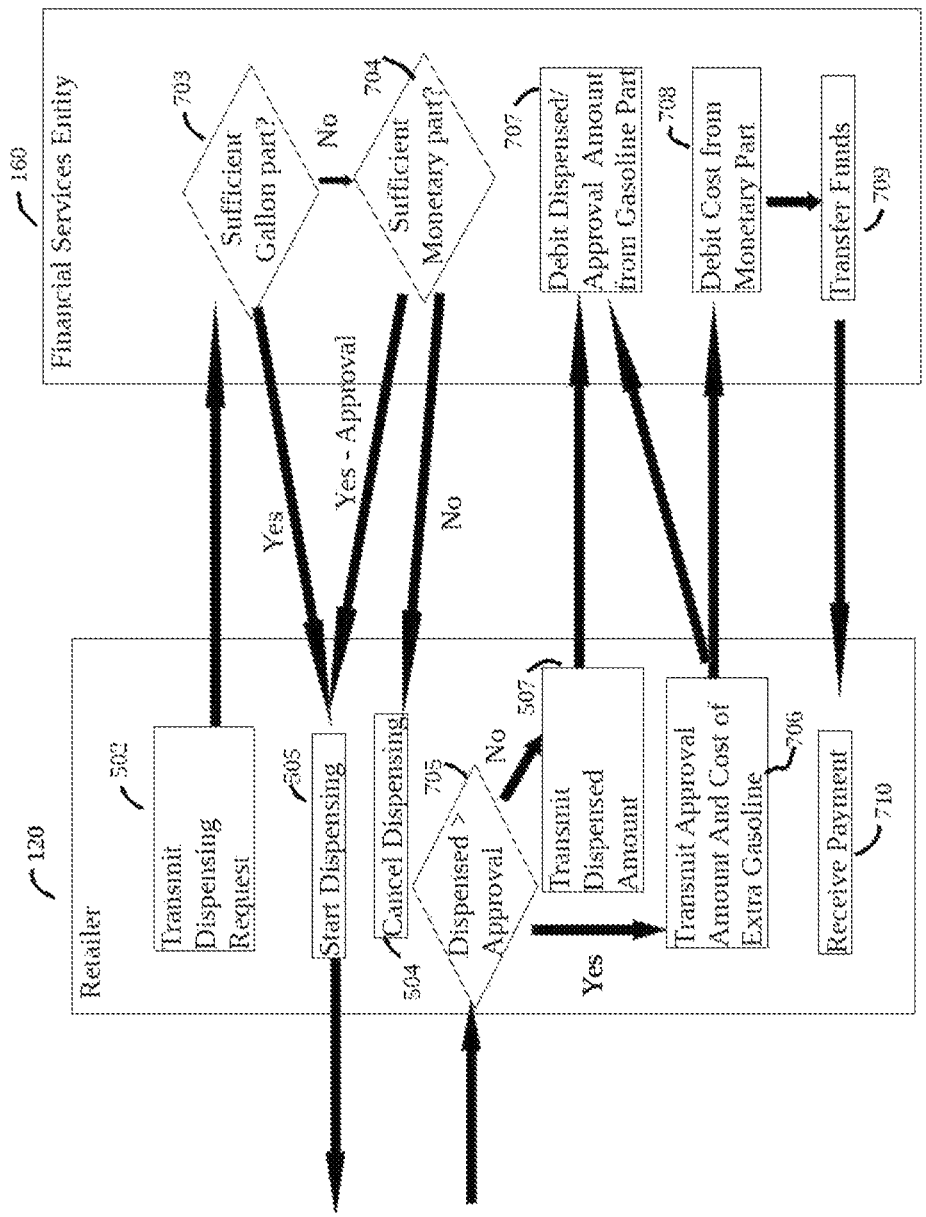
FIG. 7 is a flow diagram depicting an alternative to a part of the process depicted in FIG. 5, in accordance with an embodiment of the invention.

According to an embodiment of the invention, the Retailer 120 may limit the amount of gasoline which can be dispensed based upon the approval from the Financial Services Entity 160. Alternatively, the approval from the Financial Services Entity 160 may allow the Consumer 110 to dispense more gasoline than is in the gasoline account. FIG. 7 is flow diagram representing the steps which occur upon such approval being sent to the Retailer 120. The Retailer preforms the same initial steps in dispensing gasoline. It transmits, directly or indirectly, a request to dispense gasoline (step 502) and either starts dispensing gasoline (step 505) or cancels dispensing of gasoline (504) based upon receipt of an approve (or denial) from the Financial Services Entity 160.

As in prior embodiments, the Financial Services Entity 160, determines if the Consumer 110 has a sufficient amount in a Gasoline part 262, 263 of the Consumer Account 260 (step 703). If the Consumer does, the Financial Services Entity transmits an approval to the Retailer 120 to start dispensing gasoline (step 505). However, if the Consumer does not have a sufficient amount, the Financial Services Entity 160 verifies if the Consumer 110 has sufficient funds, either through prepayment or as credit, in the Monetary part 261 of the Consumer Account 260 to purchase additional gasoline (step 704). If the Consumer has sufficient funds, the Financial Services Entity 160 transmits an approval to dispense gasoline. This approval includes an approved amount of gasoline corresponding to the amount in the Gasoline part 262, 263 of the Consumer Account 260. The approval also includes an indication that an additional amount of gasoline can be dispensed and will be paid for.

The Retailer 120 does not limit the amount of gasoline which can be dispensed to the approval amount. Instead, after the total gasoline has been dispensed, the Retailer determines if the amount dispensed exceeds the approval amount of gasoline (step 705). If the dispensed amount is below the approval amount, the Retailer 120 transmits the dispensed amount to the Financial Services Entity (step 507). The Retailer may also transmit the dispensed amount to the Supplier 130 as discussed above with respect to FIG. 5. If the dispensed amount exceeds the approval amount, the Retailer 120 transmits the approval amount, the amount of gasoline dispensed over the approval amount, and the cost of the extra gasoline at the current Retailer price (step 706). The Retailer may also transmit the approval amount to the Supplier 130, which represents the amount of gasoline dispensed which was pre-purchased from the Supplier 130. Alternatively, the Financial Services Entity 160 transmits the information to the Supplier. The Supplier 130 debits and credits accounts in the same manner as described above with respect to FIGS. 5 and 6. The Financial Services Entity 160 debits either the dispensed amount (if less than the approval amount) or the approval amount from a Gasoline part 262, 263 of the Consumer Account 260. The Financial Services Entity further debits the cost of the extra gasoline from the Monetary part 261 of the Consumer Account (step 708) and transfers funds to the Retailer 120 to cover the cost of gasoline over the approval amount of gasoline (step 708). The debiting of the Monetary part of the Consumer Account and the payment of funds to the Retailer 120 works in the same manner as it would for an ordinary credit account on behalf of the Consumer 110.

Figure 8B:
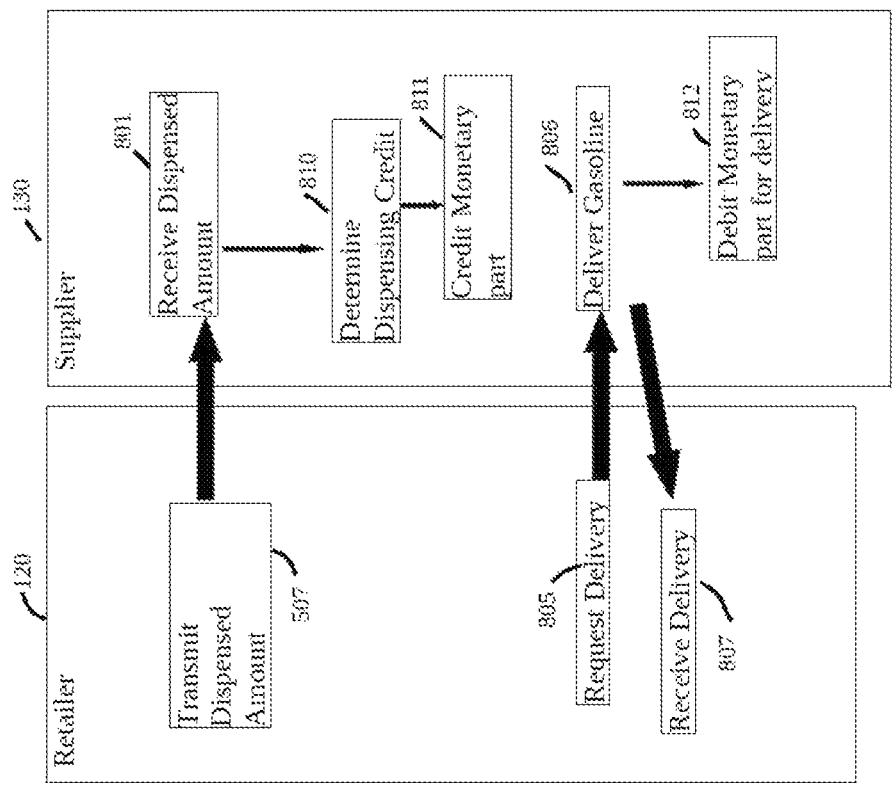
FIGS. 8A and 8B are flow diagrams depicting representative processes for providing gasoline from a Supplier to a Retailer in accordance with embodiments of the invention.
Figure 8A:
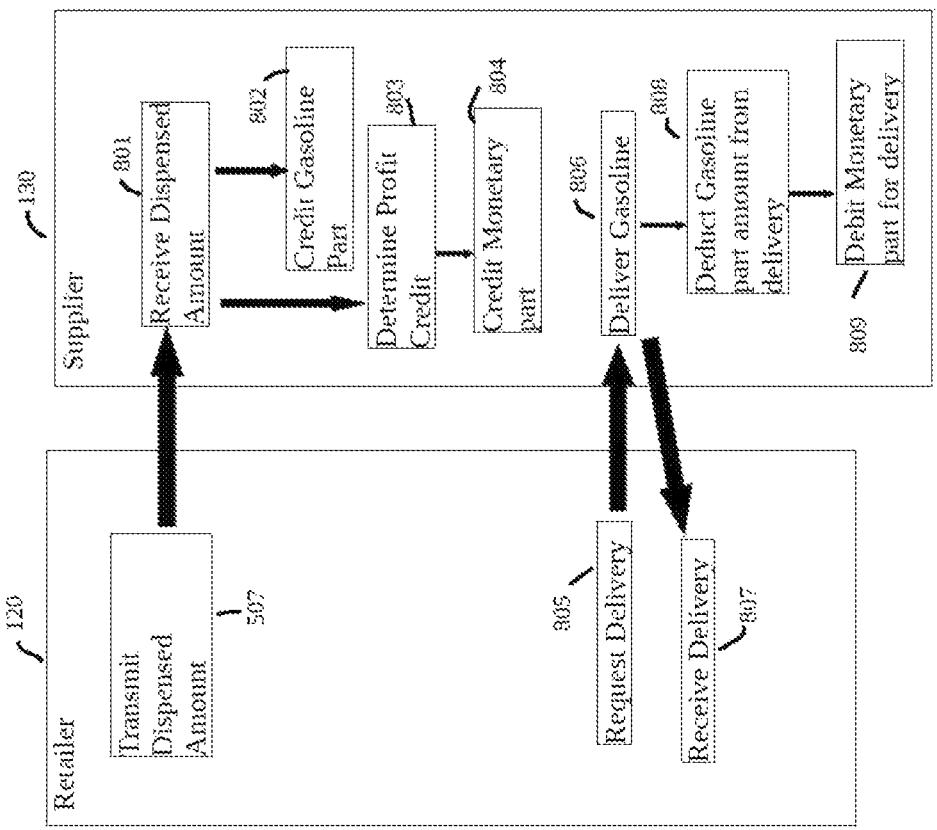

Since the Supplier 130 has sold the gasoline and the Retailer 110 has dispensed the gasoline, the Supplier 130 needs to compensate the Retailer 110 for the gasoline which has been dispensed. Compensation is provided the Supplier 130 through the crediting of the Retailer Account 240 (step 510 in FIG. 5). Since the Supplier 130 delivers gasoline to the Retailer 120 for sale, crediting of the Retailer Account 240 is used to offset amounts which would otherwise be owed by the Retailer 120 to the Supplier 130. FIGS. 8A and 8B are flow diagrams representing two embodiments of the invention for crediting of the Retailer account by the Supplier 130.

In the embodiment of FIG. 8A, the Retailer account includes a Monetary part 241 (FIG. 3) and one or more Gasoline parts 242, 243 corresponding to types of gasoline sold by the Retailer 120. The Retailer 120 transmits the amount and type of gasoline dispensed, directly or indirectly, to the Supplier 130 (step 507), as discussed above. Upon receipt of the information from the Retailer that gasoline has been dispensed (step 801), the Supplier 130 credits the gasoline account of the Retailer for the amount of gasoline dispensed (step 802). When gasoline is later delivered to the Retailer (step 806), the amount of gasoline in the Gasoline part 242, 243 of the Retailer Account 240 is deducted from the delivered amount (step 808) before charges are applied to the Monetary part 241 of the Retailer Account 240 (step 809). In this manner, gasoline is supplied to the Retailer to cover the amounts dispensed under the system of the present invention without charge and without regard to the prices of gasoline at the times it was acquired by the Retailer 120, dispensed by the Retailer 120, or delivered by the Supplier 130.

However, the Retailer 120 also has received no profit on the dispensed gasoline, nor have any expenses been covered relating to the provision of the dispensed gasoline. Preferably, the Supplier 130 would provide some compensation to the Retailer 120 for providing the gasoline. Such compensation could be built into the prices charged by the Supplier 130 to the Retailer 120 for gasoline. Alternatively, the Supplier 130 can provide a credit to the Retailer 120 based upon the amount of gasoline dispensed. Accordingly, upon receipt of an amount of gasoline dispensed (step 801), the Supplier determines a credit amount to be provided to the Retailer 120 (step 803). The credit amount could correspond to lost profit and expenses (or some portion thereof) on a per gallon basis or some other way. The credit amount is credited to the Monetary part 241 of the Retailer Account 240. Any credits in the Monetary part 241 of the Retailer Account 240 are applied against amounts owed by the Retailer 120 for gasoline delivered to the Retailer 120 or in the future. Thus, the Supplier 130 provides monetary compensation (135 in FIG. 2) to the Retailer for dispensing gasoline on its behalf under the system of the present invention.

FIG. 8B illustrates the process for another embodiment of the invention in which the Retailer Account 240 does not include a Gasoline parts 242, 243. In this embodiment, when the dispensed amount is received (step 801), the Supplier 130 determines a monetary equivalent for the amount of gasoline dispensed (step 810). Preferable, the monetary equivalent would be based upon the current price at which the Supplier 130 sells gasoline to the Retailer 120 plus an amount for profit and expenses. The Supplier 130 credits the Monetary part 241 of the Retailer Account 240 with the determined monetary equivalent (step 811). As in the previous embodiment, any credits in the Monetary part 241 of the Retailer Account 240 are applied against amounts owed by the Retailer 120 for delivery of gasoline from the Supplier 130.

For groceries, the processes illustrated in FIGS. 8A and 8B are not significantly different than for gasoline. In FIG. 8A, at step 507, the Retailer transmits the list of dispensed grocery items and quantities, rather than a single amount of gasoline. Alternatively, the Retailer 120 could transmit each item and quantity in separate transactions, in which case, it would be identical to dispensed amounts of a type of gasoline. Upon receipt of the dispensed amounts of groceries, the Supplier credits the grocery parts (instead of the gasoline part) at step 802. The Supplier also determines a profit credit and credits the monetary part of the Retailer account at steps 802 and 803. When the Retailer 120 needs additional stock, it requests a delivery of grocery items from the Supplier at step 805. The Supplier 130 delivers the groceries and deducts all credited grocery items from the grocery parts of the Retailer account from the amounts delivered to the Retailer 120 before determining charges for the groceries delivered. The Supplier debits the monetary part of the Retailer account for the adjusted amount of groceries delivered. The Retailer 120 only owes for the adjusted amounts, less any remaining credits from the profit credits determinations.

The process illustrated in FIG. 8B would also be applicable to the sale of groceries. In this embodiment, the Retailer account does not include grocery parts. Upon receipt of dispensed groceries, the Supplier determines a dispensing credit for the dispensed groceries. The dispensing credit would be based upon the current prices charged by the Supplier to the Retailer for each grocery item plus an amount compensating the Retailer for its forgone profit and costs associated with a sale of those items. The Retailer account is credited with the determined amount. When future deliveries are made to the Retailer, any credits in the Retailer account offset a portion of the charges for the delivered items.

According to an embodiment of the invention, a Consumer 110 can transfer amounts in a Gasoline part 262, 263 of the Consumer Account 260 to the Consumer Account 270 another Consumer 111. FIG. 9 is a flow diagram representing a such as transfer according to an embodiment of the invention. The Consumer 110 accesses account information at the Financial Services Entity and selects an amount and type of gasoline available in a Gasoline part 262, 263 of the Consumer Account 260. The Consumer 110 transfers the amount and type of gasoline to the Financial Services Entity 160 along with information about the Consumer 111 to receive the gasoline amount (step 901). Upon receipt of the transfer information, the Financial Services Entity 160 verifies that the Consumer 110 has a sufficient amount in the Gasoline part 262, 263 of the Consumer Account 260 (step 902) and that Consumer 111 has a Consumer Account 270 (step 904). If Consumer 110 does not have a sufficient amount in the Gasoline part 262, 263 of the Consumer Account 260 or Consumer 111 does not have a Consumer Account 270, the transfer transaction is canceled (step 903). Otherwise, the Financial Services Entity 160 debits the Gasoline part 262 of the Consumer Account 260 for the Consumer 110 (step 905) and credits a Gasoline part 272 of the Consumer Account 270 of the other Consumer 111 (step 906). The Financial Services Entity 160 informs the Consumer 110 that the transfer has been completed (step 908). The Financial Services Entity may charge a fee in connection with transfer of gasoline amounts between Consumer accounts. If a fee is charged, a debit is made to the Monetary part 261 of the Consumer Account 260. The Financial Services Entity 160 may also limit quantities of gasoline which can be transferred or set other limitations in relations to transfers between accounts. Similarly, a Consumer 110 would utilize the same process to transfer amounts of groceries to another Consumer.

In the preceding embodiments of the invention, the Supplier 130 has tracked purchasing and dispensing of gasoline based upon gasoline type. The Supplier 130 could allow the Financial Services Entity 160 to exchange one type of gasoline for another type. The Supplier 130 would provide ratios for such conversions. This would allow a Consumer 110 to dispense gasoline of a different type than was originally purchased. FIG. 10 is a flow diagram representing transfer of amounts between different Gasoline parts 262, 263 of a Consumer Account 260. The Consumer 110 accesses account information at the Financial Services Entity 160 and selects an amount and first type of gasoline available in a gasoline part of the customer account to be converted to second type of gasoline (step 1001). The amount and types of gasoline are transferred to the Financial Services Entity 160. The Financial Services Entity 160 verifies that the Consumer 110 has a sufficient amount in the Gasoline part 262 of the Consumer Account for the first type of gasoline (step 1002) and debits that amount (step 1004). The Financial Services Entity 160 further applies the appropriate conversion ratio to the amount of gasoline (step 1005) and credits the gasoline account for second type of gasoline for the amount after the conversion ratio has been applied (step 1006). The Financial Services Entity 160 further transfers to the Supplier 130 the amount of gasoline to be converted and the first and second types of gasoline. (not shown) Upon receipt of this information, the Supplier similarly debits the gasoline account for the first type of gasoline for the amount and credits the gasoline account for the second type of gasoline for the amount after applying a conversion ratio. The Financial Services Entity 160 informs the Consumer 110 that the exchange has been made. As with transfers between accounts, the Financial Services Entity 160 may charge a fee to perform an exchange. The Financial Services Entity 160 debits the Monetary part 261 of the Consumer Account 260 to cover any fees. The Supplier 130 may also charge a fee for an exchange. In such a case, the Financial Services Entity 160 would transfer funds to the Supplier 130 to cover any such fee.

A similar process could be used in connection with groceries. However, because groceries are not as fungible as gasoline types, the system could limit possible exchanges. For example, an exchange might be between different sizes of the same product or between different brands of a product. The process is the same, but only some items would have conversion ratios. Those items without conversion ratios could not be exchanged within the system.

Many financial services companies provide various benefits to Consumers in addition to control of finances. These benefits may include cash back on purchases, flight miles for purchases, etc. One benefit from financial services companies and/or Retailers relate to contributions to charitable organizations. These may include the opportunity for the Consumer to round up the purchase amount to an even dollar amount with the extra going to a charitable organization. Embodiments of the present invention can also be used to provide contributions to charitable organizations. Those contributions may be monetary or may be made in the form of credits to a Gasoline part 262, 263 of a Consumer Account 260 for a charitable organization. When purchasing gasoline, the Consumer may include a portion of the purchase to go to the gasoline account for a designated charitable organization. The Consumer may also transfer amounts of gasoline from the Consumer account to a charitable organization account at any time, as in transferring to another Consumer account. FIGS. 11A and 11B illustrate other alternatives for charitable giving in connection with the dispensing of gasoline.

As illustrated in FIG. 11A, upon receipt of the amount of dispensed gasoline from the Retailer (step 1101), the Financial Services Entity 160 determines an adjusted amount of gasoline greater than the dispensed amount (step 1102). The adjusted amount may be based upon a next higher even amount of gallons of gasoline. Alternatively, the adjusted amount may be based upon a set amount, such as the next higher 5 gallons or 10 gallons. Alternatively, the adjusted amount may be a percentage of the dispensed amount. The Consumer 110 may be able to select the manner of determining the adjusted amount as part of setting up the Consumer Account 260. The Financial Services Entity 160 debits the Gasoline part 262, 263 of the Consumer Account 260 the adjusted amount of gasoline (step 1104). The Financial Services Company then credits the difference between the adjusted amount and the dispensed amount of gasoline to a Gasoline part of a Consumer Account for the charitable organization (step 1105). The Charitable Organization then has access to gasoline to use for its charitable purchases.

In another embodiment, the Consumer 110 makes monetary contributions to the charitable organization based upon dispensed gasoline as illustrated in FIG. 10B. Upon receipt of the amount of dispensed gasoline from the Retailer 130 (step 1101), the Financial Services Entity 160 debits the dispensed amount from a Gasoline part 262, 263 of the Consumer Account 260 (step 1105) as in ordinary operation of the system of the present invention. The Financial Services Entity 160 then determines a Contribution Amount based upon the dispensed amount of gasoline. The Contribution Amount may depend upon the value of the gasoline or may be a flat amount. The Contribution Amount may be based upon the difference in prices of gasoline between the times that the Consumer 110 purchased and dispensed the gasoline. The Contribution Amount is debited from the Monetary part 261 of the Consumer Account 260. The Contribution Amount is also credited to the Monetary part 261 of a Consumer Account 260 of a charitable organization. Alternatively, the Financial Services Entity 160 can transfer funds to a charitable organization corresponding to the Contribution Amount. In this way, a portion of the savings experienced by the Consumer through the system of the present invention can be contributed to a charitable organization.

Figure 12:
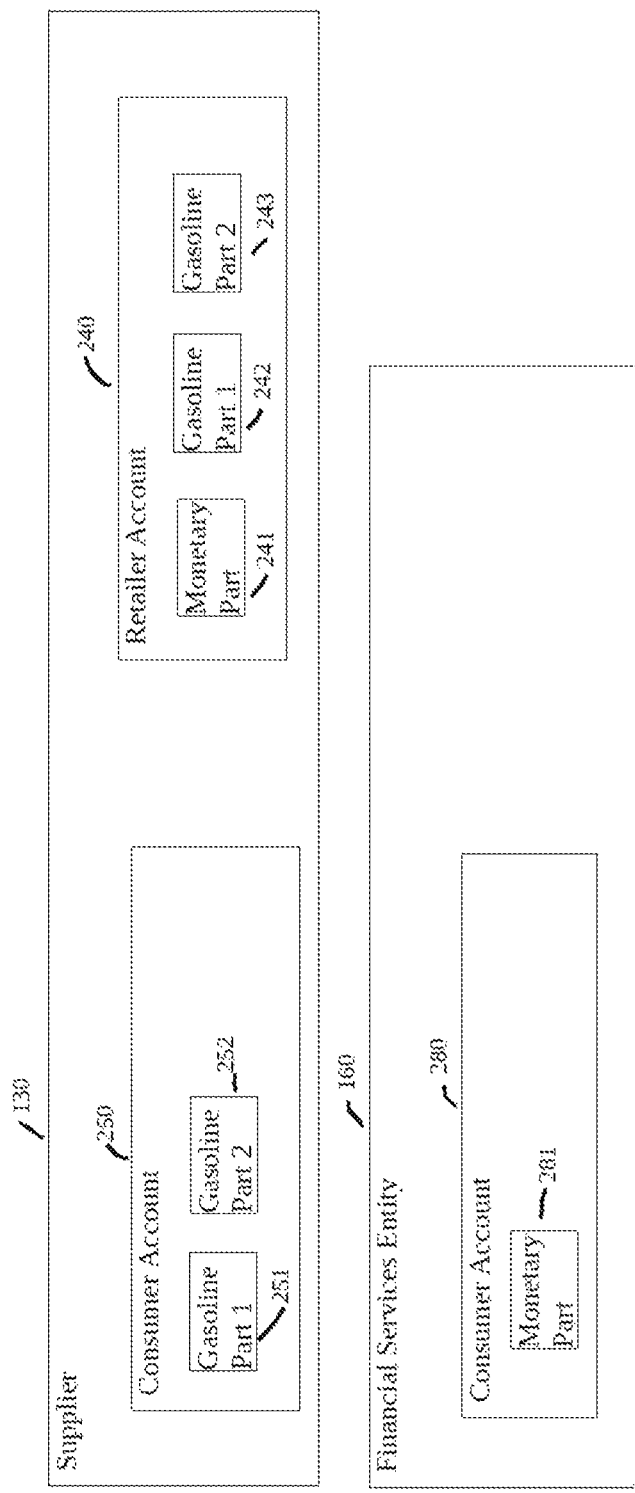
FIG. 12 is a block diagram depicting a representative financial services account system for commodity distribution in accordance with a second embodiment of the invention.

FIGS. 12-15 illustrate an embodiment of the present invention in which the Supplier 130 maintains the Customer Accounts. In such a case, the Financial Services Entity 160 in many ways functions like a regular credit company. FIG. 12 illustrates the accounts utilized in this embodiment of the invention. The Financial Services Entity 160 maintains a Customer Account 280 which only includes a Monetary part 281. Credits and debits are made to the Monetary part 281 of the Consumer Account 280 as they would be for credits and debits to the Monetary part of the Consumer Account of the first embodiment. The Supplier 130 does not maintain Gasoline Accounts on behalf of the Financial Services Entity 160. Instead, the Supplier 130 maintains Consumer Accounts 250 for each consumer participating in the system. The Consumer Accounts 250 include one or more Gasoline parts 251, 252 corresponding to types of gasoline. The Supplier 130 still has Retailer Accounts 240 as in the first embodiment.

Figure 13:
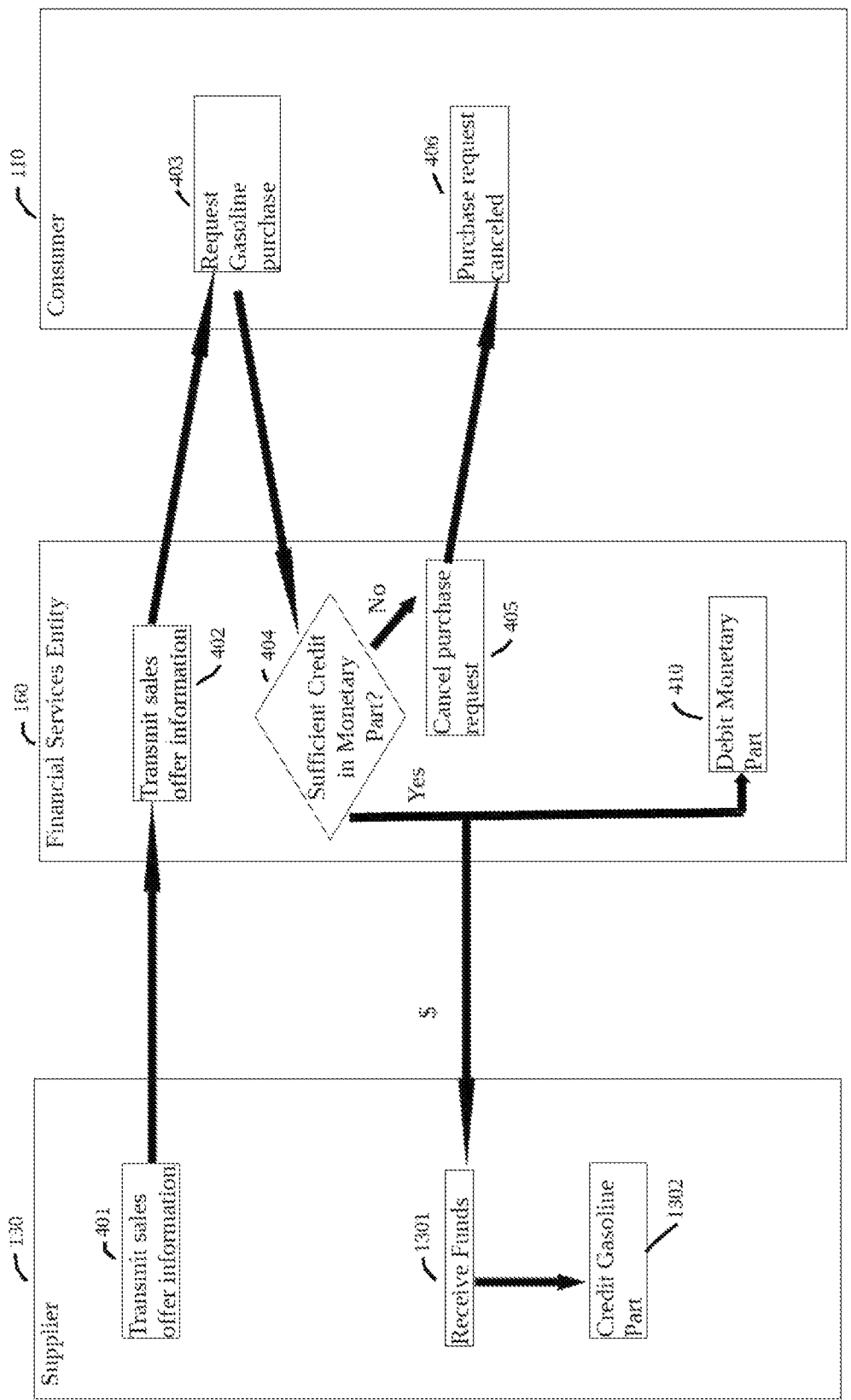
FIG. 13 is a flow diagram depicting a representative process for purchase of gasoline from a Supplier by a Consumer in accordance with an embodiment of the invention.

FIG. 13 is a flow diagram representing the process for purchasing gasoline according to this embodiment. It is similar to the process illustrated in FIG. 4 for the previously described embodiment. At step 401, the Supplier 130 provides sales offer information to the Financial Services Entity 160. Sales offer information may include types of gasoline with corresponding amounts available for purchase and prices. At step 402, the Financial Services Entity 160 provides the sale offer information to the Consumer 110. As in the first embodiment, the information is provided by means of a website or computer application, such as mobile applications. At step 403, the Consumer 110 uses the website or computer application to request a purchase of gasoline in accordance with the terms of the sales offer information. At step 404, the Financial Services Entity 160 verifies that the Consumer 110 has sufficient credit and/or funds in the Monetary part 281 of the Consumer account 280 (FIG. 12) to complete the purchase. If there are insufficient funds, the Financial Services Entity 160 cancels the purchase (step 405) and informs the Consumer, through the website or computer application, that the purchase has been canceled (step 406). If there are sufficient credit or funds in the monetary part of the Financial Services Entity 160 debits funds for the total cost of the gasoline from the monetary part 281 of the Consumer account 280 (step 410). The Financial Services Entity 160 transfers funds to the Supplier 130 for the amount of the purchase (step 407) and provides information regarding the type of gasoline, amount purchased and the consumer. The Supplier receives the funds (step 1301) and credits one of a Gasoline part 251, 252 of the Consumer Account 250 for that consumer for the amount of gasoline purchased (step 1302) for the type of gasoline purchased.

Figure 14A:
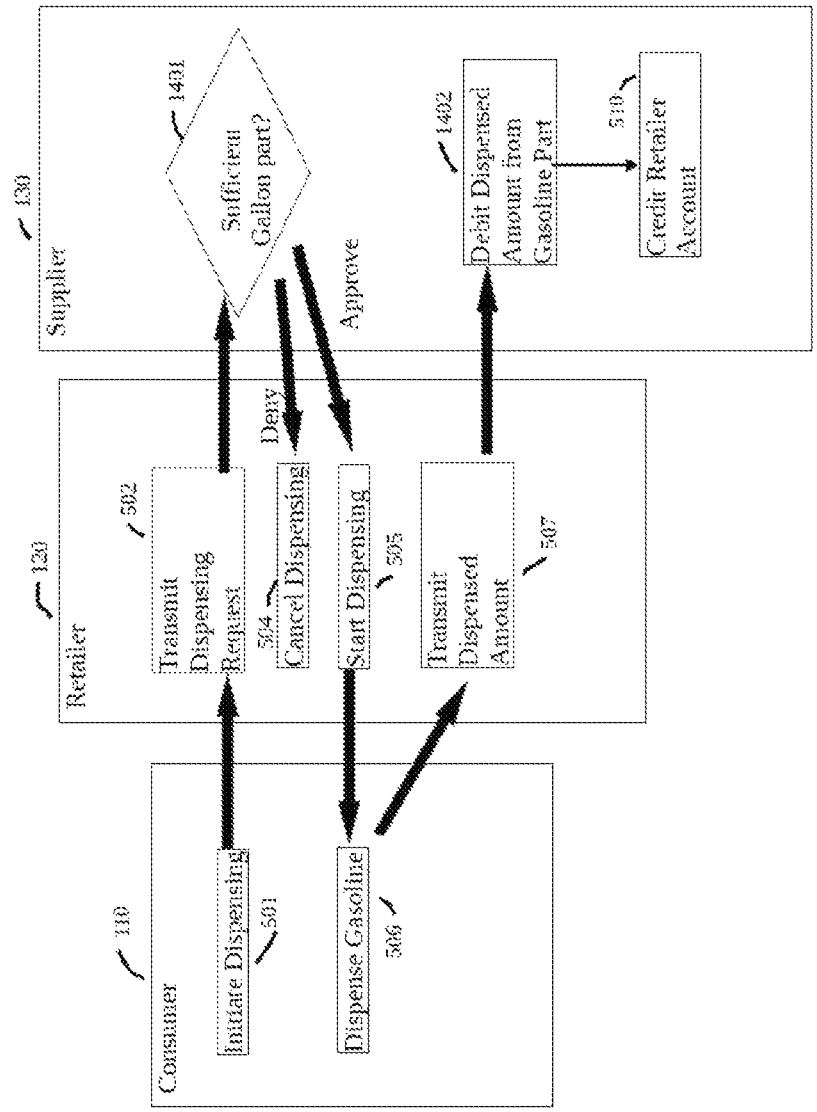
FIG. 14A is a flow diagram depicting a representative process for dispensing of gasoline to a Consumer in accordance with an embodiment of the invention.

FIG. 14A is a flow diagram for the process of dispensing gasoline according to the second embodiment of the invention. This process involves the Consumer 110, Retailer 120 and Supplier 130. The Financial Services Entity 160 is not involved in dispensing gasoline in the process. The actions of the Consumer 110 and Retailer 120 are the same as for dispensing gasoline in the first embodiment, as illustrated in FIG. 5. The operation of these steps (501-507) are not repeated here and are the same as in the description of FIG. 5. The only difference is that the Retailer 120 transmits all information to the Supplier 130, rather than to the Financial Services Entity 160.

Upon receipt of a request for approval to dispense gasoline, the Supplier 130 verifies that the Consumer 110 has a sufficient amount in a Gasoline part 251 of a Consumer Account 250 for the type of gasoline selected to be dispensed. If the Consumer Account has a sufficient amount, an approval is sent to the Retailer 120. Upon receipt of the approval, the Retailer 120 allows the selected type of gasoline to be dispensed from the pump (step 505). If the Consumer 110 does not have sufficient gasoline in the Gasoline part 251, 252 of the Consumer Account 250, the Supplier denies dispensing of gasoline and the Retailer 120 terminates dispensing (step 504).

When approved, the Consumer 110 dispenses gasoline from the pump (step 506). After the gasoline is dispensed, the Retailer 120 transfers the amount of gasoline dispensed to the Supplier 130 (step 507). Upon receipt of the amount of gasoline dispensed, the Supplier 130 debits the amount of gasoline from the Gasoline part 251, 252 of the Consumer Account 250 (step 1402) and credits the Retailer account (step 510).

Figure 14B:
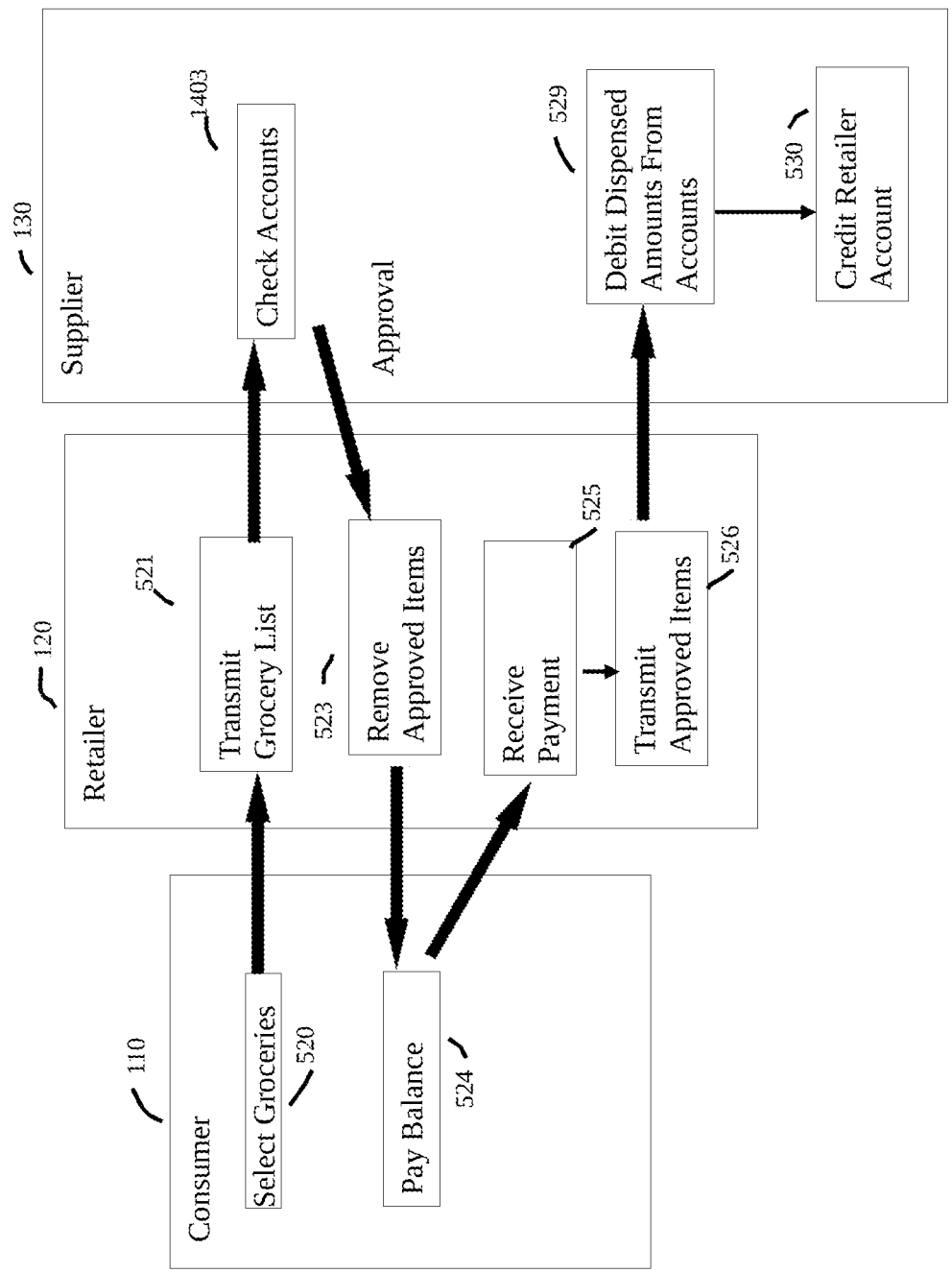
FIG. 14B is a flow diagram depicting a representative process for dispensing of groceries to a Consumer in accordance with an embodiment of the invention.

FIG. 14B is a flow diagram illustrating a process for dispensing groceries. In this embodiment, the process steps of the Consumer and the Retailer are the same as in the embodiment illustrated in FIGS. 5B and 6B. The Consumer 110 selects groceries at step 520. The list of grocery items is transmitted by the Retailer 120 to the Supplier 130. In this embodiment, all Consumer accounts are maintained by the Supplier 120. Therefore, the Supplier checks whether the Consumer accounts have sufficient quantities of the grocery items from the list at step 1403. An approval of items from the grocery list for which there are items in the Consumer accounts, and the approved quantities from the accounts, is transmitted by the Supplier 130 to the Retailer 120. Charges for the approved items are removed by the Retailer at step 523 and the Consumer 110 pays any remaining balance at step 524. After receiving payment at step 525, the Retailer transmits the approved and dispensed items to the Supplier 130. The Supplier debits the dispensed items from the Consumer accounts at step 529 and credits the Retailer account at step 530.

Figure 15:
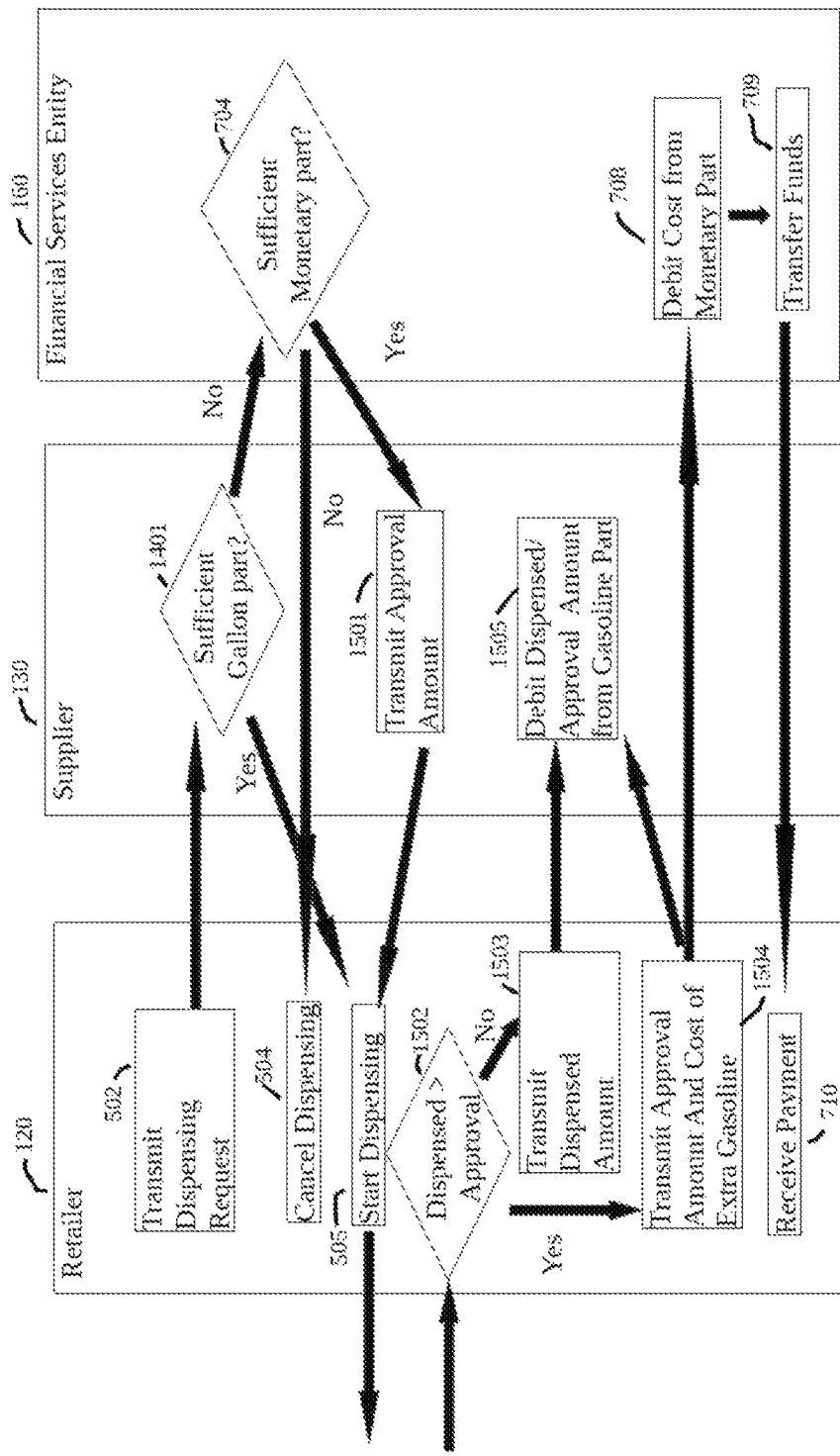
FIG. 15 is a flow diagram depicting a representative process for dispensing gasoline when a Consumer does not have a sufficient amount in a Gasoline part of a Consumer Account, in accordance with an embodiment of the invention.

FIG. 15 is a flow diagram illustrating a process for dispensing gasoline when the Consumer 110 does not have a sufficient amount in a Gasoline part 251, 252 of the Consumer Account 250. This process is similar to the process shown in FIG. 7, in that an additional amount of gasoline is paid for by the Financial Services Entity 160 at the current retail price. As in the embodiment shown in FIG. 14, upon receipt of a request to dispense gasoline from the Retailer 120, the Supplier 130 determines if the Consumer 110 has a sufficient amount in a Gasoline part 251, 252 of the Consumer Account 250 (step 1401). If the Consumer does, the Supplier 130 transmits an approval to the Retailer 120 to start dispensing gasoline (step 505). However, if the Consumer does not have a sufficient amount, the Supplier 130 sends a request to the Financial Services Entity 160 which verifies if the Consumer 110 has sufficient funds, either through prepayment or as credit, in the Monetary part 281 of the Consumer Account 280 to purchase additional gasoline (step 704). If the Consumer has sufficient funds, the Financial Services Entity 160 transmits an approval to the Supplier 130, which forwards the approval to the Retailer 120 to dispense gasoline. The approval from the Supplier 130 includes an approved amount of gasoline corresponding to the amount in the Gasoline part 251, 252 of the Consumer Account 250. The approval also includes an indication that an additional amount of gasoline can be dispensed and will be paid for.

The Retailer 120 does not limit the amount of gasoline which can be dispensed to the approval amount. Instead, after the total gasoline has been dispensed, the Retailer determines if the amount dispensed exceeds the approval amount of gasoline (step 1502). If the dispensed amount is below the approval amount, the Retailer 120 transmits the dispensed amount to the Supplier (step 1503). If the dispensed amount exceeds the approval amount, the Retailer 120 transmits the approval amount to the Supplier 130 (step 1504). The approval amount is debited from the Gasoline part 251, 252 of the Consumer Account 250. The Retailer also transmits the amount of gasoline dispensed over the approval amount, and the cost of the extra gasoline at the current Retailer price to the Financial Services Entity 160. The Financial Services Entity debits the cost of the extra gasoline from the Monetary part 281 of the Consumer Account 280 (step 708) and transfers funds to the Retailer 120 to cover the cost of gasoline over the approval amount of gasoline (step 709). The debiting of the Monetary part of the Consumer Account and the payment of funds to the Retailer 120 works in the same manner as it would for an ordinary credit account on behalf of the Consumer 110.

According to embodiments of the present invention, as illustrated in FIGS. 2, 3 and 12, the Financial Services Entity 160 is a distinct entity from the Supplier 130 and the Consumer 110. However, the Financial Services Entity 160 could be a part of the Supplier 130 and not a separate entity. Suppliers 130 are known to have financial service entities 160 as part of their corporate structure. For example, large gasoline companies have credit card departments which provide credit to Consumers for purchase of gasoline. The credit card departments operate as a distinct Financial Services Entity within the gasoline company. Such credit card departments, however, operate in the same manner as a Financial Services Entity 61 of the prior art (FIG. 1). They operate to facilitate the sale of gasoline by the Retailer. They do not operate in a manner in accordance with the present invention wherein the Supplier 130 sells the gasoline to the Consumer 110 to be dispensed by the Retailer 120. Therefore, the inclusion of the Financial Services Entity 160 within the corporate structure of a Supplier 130 is within the present invention. All of the processes performed by the Financial Services Entity 160 are still carried out, just as a part of the Supplier 130, and communications and transfers between the Supplier 130 and the Financial Services Entity 160 are unnecessary.

Taxes can present some unique problems within the system of the present invention, particularly taxes associated with the sale of commodities, such as sales taxes or gasoline taxes. In some cases, taxes may be owed when the Consumer 110 purchases the commodity from the Supplier 130. In other cases, taxes may be owed when the Consumer 110 receives the commodity from the Retailer 120. If taxes can be determined at the time of the sale by the Supplier 130, whether or not due at that time, the Supplier can collect the taxes at the time of sale. If taxes are not due until dispensing, the Supplier 130 would either pay the taxes at that time, transfer the money to the Retailer 120 to pay the taxes, or credit the Retailer Account 240 for the amount of the taxes. If taxes cannot be determined until the time of dispensing, the Financial Services Entity 160 may charge Consumer 110 for the amount of such taxes. The Financial Services Entity 160 could pay those taxes either to the Supplier 130 as with any other payment or to the Retailer 120, as with a payment for gasoline above the amount in the Consumer Account 260. Gasoline taxes in the United States provide a good example of the possibilities for collecting and paying taxes. Gasoline taxes are a fixed amount based upon the number of gallons sold. However, there are federal, state and local amounts for these taxes. Since federal gasoline taxes are consistent across the entire country, the Supplier 130 can collect those taxes for the number of gallons of gasoline purchased. The Supplier 130 would supply the amount of those taxes to the Retailer 120 when the gasoline is dispensed so that the Retailer 120 can pay the necessary taxes. State and local taxes depend upon the location of the Retailer 120 which dispenses the gasoline. These taxes can be collected by either the Supplier 130 or Retailer 120 from the Financial Services Entity 160 at the time of dispensing. The Financial Services Entity 160 either collects the amount from the Consumer 110 at a later date, or has a prepayment from the Consumer 110 to cover these taxes. Alternatively, the Supplier 130 can collect an amount for state and local taxes, such as an amount for the location of the Consumer 110, at the time of purchase. Adjustments would only be necessary if the Consumer 110 dispensed gasoline at a location with a different amount for state and local taxes. In that case, the Consumer 110 might get a credit if taxes are less.

It should be appreciated that numerous variations on the particular embodiments described above are possible, and such variations are considered to be within the spirit and scope of the invention. For example, variations on the methods described herein may not include all of the acts described above, may include acts which are not described above, and/or may provide for various acts to be performed in a different order or manner than is described above. Similarly, variations on the interactions between and arrangements amongst entities described herein may not include all of the interactions and arrangements described above, may include interactions and arrangements not described above, and/or may provide for interactions and arrangements between entities in a different order or manner than is described above. The invention is not limited to the particular embodiments described above.

It should also be appreciated that the invention is not limited to being employed with the particular commodities described above (e.g., gasoline, groceries, etc.). As one of many examples, some embodiments of the invention may enable an individual or entity to pre-purchase carbon tax credits at a particular price. The invention is not limited to supporting the pre-purchase of any particular commodity or commodities.

It should further be appreciated that some embodiments of the invention may enable one user to pre-purchase a commodity, and then later transfer some or all of the pre-purchased commodity to another user. In some embodiments, this type of transfer may occur between accounts associated with different users. As one example, an individual may pre-purchase a given quantity of a commodity at a given price, so that the quantity of the commodity is credited to the individual's account, and later donate that quantity (or some subset) of the commodity to another user, such as to a charity. As another example, a governmental entity may pre-purchase a given quantity of a commodity (e.g., food, gasoline, etc.) at a given price, so that the quantity of the commodity is credited to the governmental entity's account, and the governmental entity may later disburse the purchased quantity (or some subset) of the commodity to accounts associated with one or more individuals, similar to the disbursement of "food stamps" or other aid programs. As yet another example, transfers between accounts may enable users to barter or exchange commodities. For example, a first user may pre-purchase a quantity of a first commodity, so that the quantity of the first commodity is credited to the first user's account, and then later agree to transfer that quantity (or some subset) of the first commodity to a second user in exchange for a specified amount of a second commodity. Any of numerous types of transfers of commodities between users and associated accounts may be envisioned.

It should be also appreciated that numerous environmental and/or technological benefits may flow from the systems and methods disclosed herein. For example, the ability to pre-purchase gasoline at a low price may cause consumers to limit their gasoline consumption to the amount pre-purchased, if the alternative is having to buy more gasoline at a higher price. This may result in lower gasoline consumption by individual consumers, and by the overall population of consumers who take advantage of the system, and thus lower overall emissions, benefiting the environment.

The ability to pre-purchase gasoline at a low price may also result in fewer gasoline purchase transactions, since consumers may have an incentive to purchase an amount of gasoline sufficient to last an extended period upon determining that the price is low, and likely to rise in the future. Fewer gasoline purchase transactions may result in less associated transaction data, and so as a result, a system implemented in accordance with some embodiments of the invention may experience reduced network traffic and latency (i.e., since there may be less transaction data to flow over a given network), and consume fewer processing and storage resources (i.e., since there may be less transaction data to process and/or store), as compared with conventional systems, and thus be less costly to maintain overall.

What is claimed is:

1. A computer-implemented method, comprising acts of:

receiving, via at least one network, by one or more computer processors of a processing system executing instructions stored by at least one tangible, non-transitory storage medium, an indication of a first purchase by a first consumer of a first amount of a first commodity at a first price;

in response to receiving the indication of the first purchase, the one or more computer processors of the processing system executing instructions stored by the at least one tangible, non-transitory storage medium to cause an update to data stored in the at least one tangible, non-transitory storage medium corresponding to a first account associated with the first consumer, the update to the data reflecting the first account being credited by the first amount;

receiving, via the at least one network, by the one or more computer processors of the processing system, an indication of a request from the first consumer to transfer a second amount of the first commodity to a second account associated with a second consumer, the second amount being less than or equal to the first amount;

the one or more computer processors of the processing system executing instructions stored by the at least one tangible, non-transitory storage medium to access data corresponding to the first account to verify whether the first account associated with the first consumer includes at least the second amount of the first commodity;

in response to verifying that the first account associated with the first consumer includes at least the second amount of the first commodity, the one or more computer processors of the processing system executing instructions stored by the at least one tangible, non-transitory storage medium to cause an update to data corresponding to the first account and data corresponding to the second account stored by the at least one tangible, non-transitory storage medium, the update to the data corresponding to the first account reflecting the first account being debited by the second amount of the first commodity and the update to the data corresponding to the second account reflecting the second account being credited by the second amount of the first commodity;

receiving, via the at least one network, by the one or more computer processors of the processing system, an indication from a retailer system of a request by the second consumer for the retailer system to dispense a third amount of the first commodity to the second consumer, the third amount being less than or equal to the second amount;

the one or more computer processors of the processing system executing instructions stored on the at least one tangible, non-transitory storage medium to access data corresponding to the second account associated with the second consumer to verify whether the second account includes at least the third amount of the first commodity;

in response to verifying that the second account associated with the second consumer includes at least the third amount of the first commodity, the one or more computer processors of the processing system executing instructions stored on the at least one tangible, non-transitory storage medium to cause an approval to be transmitted via the at least one network to the retailer system to dispense the third amount of the first commodity to the second consumer; and in response to receiving an indication via the at least one network from the retailer system that the third amount of the first commodity has been dispensed to the second consumer, the one or more computer processors of the processing system executing instructions stored on the at least one tangible, non-transitory storage medium to cause an update to data stored on the at least one tangible, non-transitory storage medium corresponding to a retailer system account, the update reflecting a credit to the retailer system account of consideration corresponding to the third amount of the first commodity.

2. The method of claim 1, wherein the first commodity is gasoline.

3. The method of claim 1, comprising acts of:
receiving, by the one or more computer processors of the processing system, an indication of a second purchase by the second consumer of a second commodity; and
the one or more computer processors of the processing system executing instructions stored by the at least one tangible, non-transitory storage medium to cause an update to data corresponding to the second account associated with the second consumer, the update reflecting the second account being debited in accordance with the second purchase.

4. The method of claim 3 wherein the first commodity is a first type of gasoline and the second commodity is a second type of gasoline.

5. The method of claim 4 wherein the first type of gasoline has a first octane rating and the second type of gasoline has a second octane rating.

6. The method of claim 3, comprising acts, performed in response to receiving an indication to dispense the second commodity, of:
the one or more computer processors of the processing system executing instructions stored by the at least one tangible, non-transitory storage medium to apply a conversion ratio between the first commodity and the second commodity, and the one or more computer processors of the processing system executing instructions stored by the at least one tangible, non-transitory storage medium to cause an update to data corresponding to the second account associated with the second consumer, the update reflecting the second account being debited in accordance with the conversion ratio.

7. The method of claim 1, comprising an act of the one or more computer processors of the processing system executing instructions stored by the at least one tangible, non-transitory storage medium to cause an update to data corresponding to the first account and/or to the second account, so as to impose a fee associated with a transfer of the second amount on the first account, on the second account, or on both the first account and the second account.

8. The method of claim 1, comprising an act of the one or more computer processors of the processing system executing instructions stored by the at least one tangible, non-transitory storage medium to impose a limit on the second amount that can be transferred.

9. The method of claim 1, comprising an act, performed in response to the one or more computer processors of the processing system receiving a request from the first consumer to transfer an amount of a third commodity to the second account, the act comprising the one or more processors of the processing system executing instructions stored by the at least one tangible, non-transitory storage medium to cause data corresponding to the first account and to the second account to be updated, the update to data corresponding to the first account reflecting the amount of the third commodity being debited from the first account and the update to the data corresponding to the second account reflecting the amount of the third commodity being credited to the second account.

10. The method of claim 9, comprising the one or more processors of the processing system executing instructions stored by the at least one tangible, non-transitory storage medium to apply a conversion ratio between the first commodity and the third commodity.

11. The method of claim 9, wherein one of the first commodity and the third commodity are gasoline, and the other is not gasoline.

12. The method of claim 9, wherein the first commodity is a first type of gasoline and the second commodity is a second type of gasoline.

13. The method of claim 12, wherein the first type of gasoline has a first octane rating and the second type of gasoline has a second octane rating.

14. The method of claim 1, wherein at least one of the first account and the second account has an associated card having both credit and debit functions.

15. The method of claim 1, wherein the first purchase for which the indication is received is by the first consumer from a manufacturer or supplier of the first commodity.

16. The method of claim 1, wherein the second consumer is a charitable organization.

17. A processing system, coupled via at least one network with a retailer system, the processing system comprising:
at least one tangible, non-transitory storage medium, storing programmed instructions and data corresponding to a plurality of accounts, the plurality of accounts comprising a first consumer account associated with a first consumer, a second consumer account associated with a second consumer, and a retailer system account;
one or more computer processors, programmed via the instructions stored by the at least one tangible, non-transitory storage medium to:

receive, via the at least one network, an indication of a first purchase by a first consumer of a first amount of a first commodity at a first price;

in response to receiving the indication of the first purchase, cause an update to data stored by the at least one tangible, non-transitory storage medium corresponding to the first account associated with the first consumer, the update to the data reflecting the first account being credited by the first amount;

receive, via the at least one network, an indication of a request from the first consumer to transfer a second amount of the first commodity to a second account associated with a second consumer, the second amount being less than or equal to the first amount;

access data corresponding to the first account stored by the at least one tangible, non-transitory storage medium to verify whether the first account associated with the first consumer includes at least the second amount of the first commodity;

in response to verifying that the first account associated with the first consumer includes at least the second amount of the first commodity, cause an update to data corresponding to the first account and to the second account stored by the at least one tangible, non-transitory storage medium, the update to the data corresponding to the first account reflecting the first account being debited by the second amount of the first commodity, the update to the data corresponding to the second account reflecting the second account being credited by the second amount of the first commodity;

receive, via the at least one network, an indication of a request by the second consumer for the retailer system to dispense a third amount of the first commodity to the second consumer, the third amount being less than or equal to the second amount;

access data corresponding to the second account associated with the second consumer stored by the at least one tangible, non-transitory storage medium to verify whether the second account includes at least the third amount of the first commodity;

in response to verifying that the second account associated with the second consumer includes at least the third amount of the first commodity, cause an approval to be transmitted via the at least one network to the retailer system to dispense the third amount of the first commodity to the second consumer; and in response to receiving an indication via the at least one network from the retailer system that the third amount of the first commodity has been dispensed to the second consumer, cause an update to data stored by the at least one tangible, non-transitory storage medium associated with the retailer system account, the update reflecting a credit to the retailer system account of consideration corresponding to the third amount of the first commodity.

18. The system of claim 17, wherein the first commodity is gasoline.

19. The system of claim 17, wherein the one or more computer processors are programmed via the instructions to receive an indication of a second purchase by the second consumer of a second commodity, and to cause an update to data corresponding to the second account associated with the second consumer, the update reflecting the second account being debited in accordance with the second purchase.

20. The system of claim 19, wherein the first commodity is a first type of gasoline and the second commodity is a second type of gasoline.

21. The system of claim 20, wherein the first type of gasoline has a first octane rating and the second type of gasoline has a second octane rating.

22. The system of claim 19, wherein the one or more computer processors are programmed via the instructions to, in response to receiving an indication to dispense the second commodity, apply a conversion ratio between the first commodity and the second commodity, and cause an update to data corresponding to the second account associated with the second consumer, the update reflecting the second account being debited in accordance with the conversion ratio.

23. The system of claim 17, wherein the one or more computer processors are programmed via the instructions to cause an update to data corresponding to the first account and to the second account so as to impose a fee associated with a transfer of the second amount on the first account, on the second account, or on both the first account and the second account.

24. The system of claim 17, wherein the one or more computer processors are programmed via the instructions to impose a limit on the second amount that can be transferred.

25. The system of claim 17, wherein the one or more computer processors are programmed via the instructions to, in response to receiving a request from the first consumer to transfer an amount of a third commodity to the second account, cause data corresponding to the first account and to the second account to be updated, the update to the data corresponding to the first account reflecting the amount of the third commodity being debited from the first account and the update to the data corresponding to the second account reflecting the amount of the third commodity being credited to the second account.

26. The system of claim 25, wherein the one or more computer processors are programmed via the instructions to apply a conversion ratio between the first commodity and the third commodity.

27. The system of claim 25, wherein one of the first commodity and the third commodity are gasoline, and the other is not gasoline.

28. The system of claim 25, wherein the first commodity is a first type of gasoline and the second commodity is a second type of gasoline.

29. The system of claim 28, wherein the first type of gasoline has a first octane rating and the second type of gasoline has a second octane rating.

30. The system of claim 17, wherein at least one of the first account and the second account has an associated card having both credit and debit functions.

* * * * *